(12) United States Patent
Hashida

(10) Patent No.: US 7,334,512 B2
(45) Date of Patent: Feb. 26, 2008

(54) VACUUM TYPE BOOSTER DEVICE

(75) Inventor: Koichi Hashida, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 10 days.

(21) Appl. No.: 11/492,840

(22) Filed: Jul. 26, 2006

(65) Prior Publication Data

US 2007/0062365 A1   Mar. 22, 2007

(30) Foreign Application Priority Data

Sep. 20, 2005 (JP) ............................. 2005-271885
Nov. 10, 2005 (JP) ............................. 2005-325735

(51) Int. Cl.
*F15B 9/10* (2006.01)

(52) U.S. Cl. .................................................. 91/376.2
(58) Field of Classification Search ............... 91/369.2, 91/376 R See application file for complete search history.

(56) References Cited

U.S. PATENT DOCUMENTS 5,323,685 A   6/1994   Wagner

2002/0069751 A1 * 6/2002 Inoue et al. ............... 91/376 R
2003/0121406 A1   7/2003 Takasaki et al.

FOREIGN PATENT DOCUMENTS

JP    5-193486    8/1993
JP    2003-191835    7/2003

* cited by examiner

*Primary Examiner*—F. Daniel Lopez
(74) *Attorney, Agent, or Firm*—Buchanan Ingersoll & Rooney PC

(57) ABSTRACT

In a vacuum type booster device, when the advance of an input member causes an atmosphere valve seat to be separated from an atmosphere valve to advance a power piston, the position of a vacuum valve seat is moved backward relative to the power piston by a distance to which the advance amount of the power piston relative to a housing is decreased at a predetermined ratio. Thus, when a slight advance of the input member causes the atmosphere valve seat to be separated from the atmosphere valve to advance the power piston relative to the housing, the vacuum valve seat is retracted relative to the power piston and is advanced by a distance which is obtained by subtracting a retraction amount of the atmosphere valve seat from the advance amount of the power piston relative to the housing, whereby a valve mechanism of the construction as aforementioned can be closed again with the advance of the power piston.

19 Claims, 9 Drawing Sheets

VACUUM TYPE BOOSTER DEVICE

INCORPORATION BY REFERENCE

This application is based on and claims priority under 35 U.S.C. 119 with respect to Japanese Applications No. 2005-271885 filed on Sep. 20, 2005 and No. 2005-325735 filed on Nov. 10, 2005, the entire contents of which are incorporated herein by reference.

BACKGROUND OF THE INVENTION

1. Field of the Invention

The present invention relates to a vacuum type booster device for vehicles and particularly, to a vacuum type booster device capable of making the operation stroke of an input member shorter than the operation stroke of an output member.

2. Discussion of the Related Art

Generally, a vacuum type booster device which is constructed to make the operation stroke of an input member shorter than the operation stroke of an output member has been known and is described in United States Patent Application Publication No. US2003/0121406 A1 (equivalent of Japanese Unexamined Published Patent Application No. 2003-191835) for example. As shown in FIG. 1 of the Application Publication, in the vacuum type booster device, a movable member 5 partitioning the interior of a shell 2 into a vacuum chamber A and a variable pressure chamber B is provided to be movable in the forward-backward direction, and a valve body 3 is provided on the movable member 5. The valve body 3 is provided with a valve mechanism 7 which is composed of an atmosphere valve 26 operable by an input shaft 8 for opening and closing the communication of the variable pressure chamber B with the atmosphere and a vacuum valve 25 for opening and closing the communication of the vacuum chamber A with the variable pressure chamber B. In the internal surface portion of the valve body 3, there is slidably inserted a cylindrical member 18 having formed thereon a vacuum valve seat 21 for the vacuum valve 25, and the cylindrical member 18 is urged backward by a spring 17. Through a variable pressure passage 28 radially holed in the valve body 3, a key member 13 passes to be movable by an axial clearance L in the forward-backward direction, and a valve plunger 16 and the cylindrical member 18 are engaged with the key member 13 to be movable by respective distances relative thereto in the forward-backward direction. An output shaft 11 is connected to an end of the valve body 3 through a reaction disc 15, so that a braking reaction force acting on the output shaft 11 is transmitted from the reaction disc 15 to the input shaft 8 through the valve plunger 16. The valve plunger 16 has formed thereon an atmosphere valve seat 22 for the atmosphere valve 26.

With this construction, even when the advance of the input shaft 8 causes the valve mechanism 7 to operate and hence, the valve body 3 to advance, the cylindrical member 18 and hence, the vacuum valve seat 21 and the key member 13 engaged with the cylindrical member 18 are held by being urged backward by the resilient force of the spring 17 at a retracted end where the key member 13 is abutting on a wall surface 2b of the shell 2 while the valve body 3 is advanced by the clearance L. Further, when the advance of the input shaft 8 brings the key member 13 into contact with a rear side end surface of the variable pressure passage 28 of the valve body 3, it results that the vacuum valve seat 21 is retracted by the clearance L relative to the valve body 3. As a consequence, the operation stroke of the output shaft 11 becomes longer by the clearance L than the operation stroke of the input shaft 8, so that it can be realized to absorb a play in the axial direction of a master cylinder or the like on the output shaft 11 side.

However, since the device described in the Application Publication is of the construction that the vacuum valve seat 21 is held at the retracted end while the valve body 3 is advanced by the clearance L, the atmosphere valve 26 remains opened even in the case of the braking manipulation being very slow, whereby the valve body 3 quickly advances by the clearance L until the rear end surface of the variable pressure passage 28 of the valve body 3 comes into contact with the key member 13. A shock operation like this may be felt by the driver as an uncomfortable feeling.

Further, in vacuum type booster devices, it is necessary for the vacuum valve 25 to secure a predetermined opening amount at the time of braking release manipulation in order to secure a predetermined responsiveness. However, since the device described in the Application Publication is of the construction that the key member 13 for determining the retracted end of the plunger 16 is utilized to hold the vacuum valve seat 21 at the retracted end and that during the non-braking operation of the valve mechanism, a first seat portion S1 of a valve member 24 is faced with the vacuum valve seat 21 with a slight clearance therebetween, the predetermined opening amount which the vacuum valve 25 has during the braking release manipulation becomes the opening amount which it has in the non-braking state. Because the predetermined opening amount becomes a loss stroke of the input shaft 8 at the time of braking manipulation, it makes a disadvantageous factor against a primary object which is to decrease the loss stroke of the input shaft 8.

SUMMARY OF THE INVENTION

Accordingly, it is a primary object of the present invention to provide an improved vacuum type booster device of a simplified construction capable of making the operation stroke of an input member shorter smoothly than the operation stroke of an output member.

Briefly, according to the present invention, there is provided a vacuum type booster device, which comprises a housing having a pressure space formed inside; a movable member provided in the housing to be movable in a forward-backward direction and partitioning the pressure space into a variable pressure chamber and a vacuum chamber; a power piston secured to the movable member; an input member and an output member carried in the power piston to be movable relative to each other in the forward-backward direction; a valve mechanism including an atmosphere valve seat and a vacuum valve seat respectively provided on the input member and the power piston, an atmosphere valve contactable to the atmosphere valve seat for making the variable pressure chamber communicate with, or blocked from, the atmosphere, and a vacuum valve contactable with the vacuum valve seat for making the variable pressure chamber communicate with, or blocked from, the vacuum chamber; and a reaction force applying mechanism for transmitting a part of a reaction force from the output member to the input member. The vacuum type booster device further comprises a vacuum valve seat retracting mechanism for moving the position of the vacuum valve seat backward relative to the power piston by a distance to which the advance amount of the power piston relative to the housing is decreased at a predetermined ratio, when the advance of the input member causes the atmosphere valve seat to be separated from the atmosphere valve to advance the power piston.

With this construction, when the advance of the input member causes the atmosphere valve seat to be separated from the atmosphere valve to advance the power piston, the position of the vacuum valve seat is moved backward relative to the power piston by the distance to which the advance amount of the power piston relative to the housing is decreased at the predetermined ratio. Thus, when a slight advance of the input member causes the atmosphere valve seat to be separated from the atmosphere valve, the power piston is advanced by the amount which is obtained by adding the retraction amount of the vacuum valve seat relative to the power piston to the advance amount of the input member, so that the valve mechanism can be closed again with the advance of the power piston. Therefore, it does not take place that the power piston is advanced as quickly as the driver is given an uncomfortable feeling when the atmosphere valve seat is separated from the atmosphere valve upon advance of the input member. Further, the power piston can be advanced smoothly with the advance of the input member, and the operation stroke of the output member can be gradually increased to be longer by a predetermined amount than the operation stroke of the input member. Accordingly, it can be realized to shorten the operation stroke of the input member at a stroke portion called a "play" which a master cylinder or the like on the output member side has at a stepping early stage of the brake pedal.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

Figure 1:
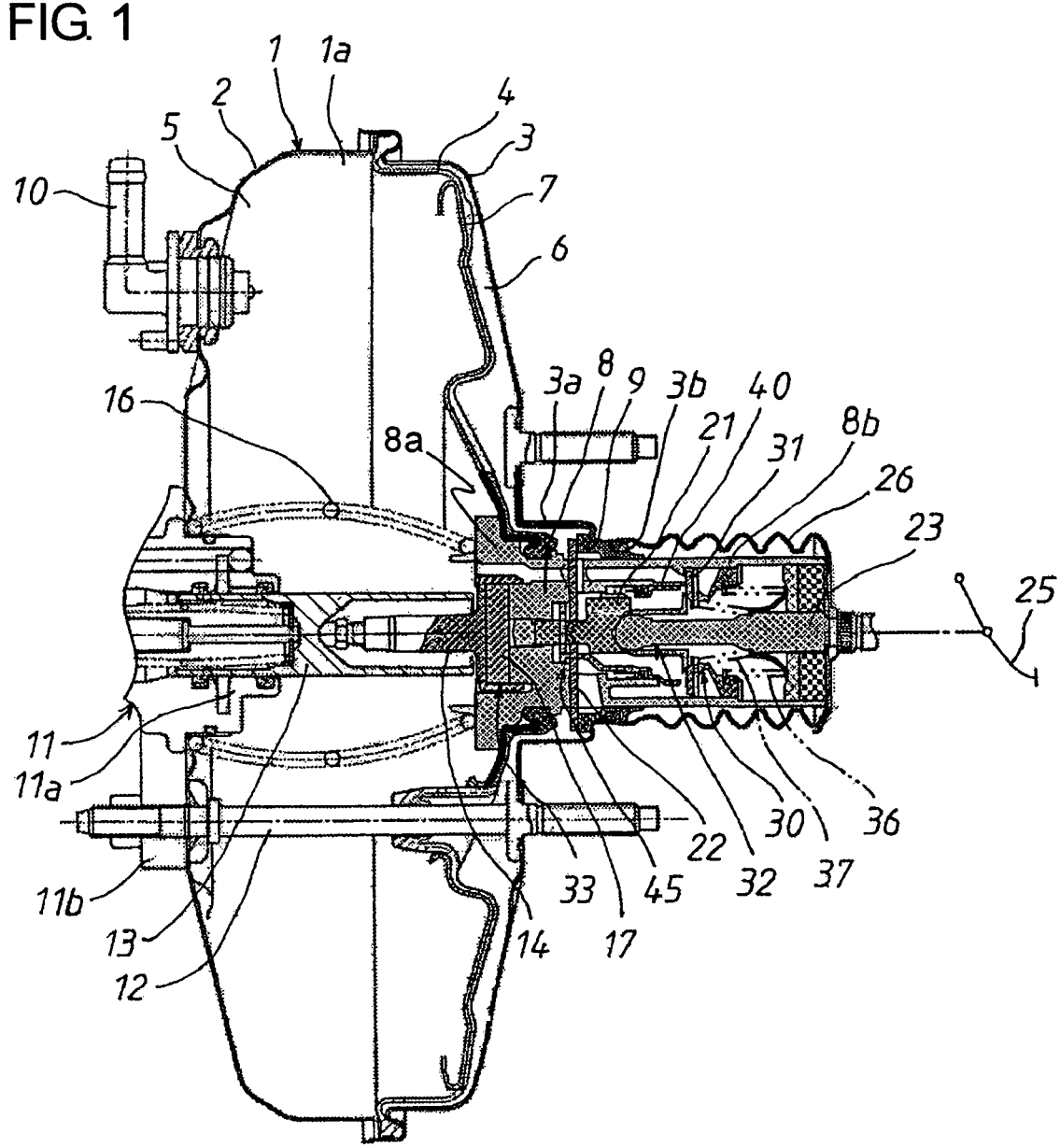
FIG. 1 is a longitudinal sectional view of a vacuum type booster device in a first embodiment according to the present invention.

Hereinafter, a vacuum type booster device in a first embodiment according to the present invention will be described with reference to the accompanying drawings. Referring now to FIG. 1, a housing 1 is composed of a front shell 2 and a rear shell 3, and between the both shells 2 and 3, a flexible diaphragm 4 serving as a movable member is secured air-tightly at its outer circumferential bead portion and partitions a pressure space 1a inside the housing 1 into a vacuum chamber 5 and a variable pressure chamber 6. A disc-like plate 7 is laminated to the diaphragm 4 within the vacuum chamber 5. A cylindrical power piston 8 is air-tightly secured to the diaphragm 4 and the plate 7, at the outer surface of a base portion 8a thereof and exposes the front end surface of the base portion 8a to the vacuum chamber 5. A vacuum leading conduit 10 is attached to the front shell 2, and the vacuum chamber 5 is in communication with an intake manifold of a combustion engine (both not shown) through the vacuum leading conduit 10 thereby to be kept at a predetermined pressure of vacuum during the operation of the combustion engine.

Figure 2:
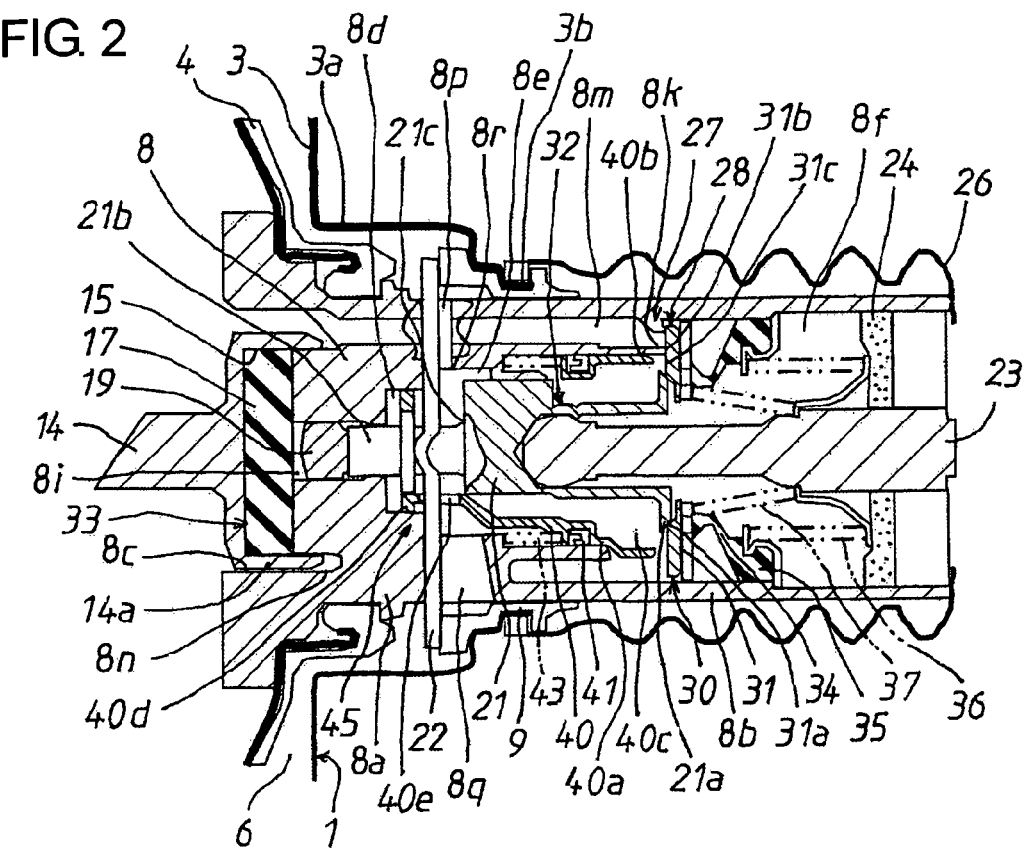
FIG. 2 is an enlarged fragmentary sectional view of a valve mechanism section in the non-braking state in the first embodiment.

As shown in FIG. 2, the rear shell 3 is bent at its center portion outwardly thereby to protrude a cylindrical protruding portion 3a backward and has a through hole 3b formed to extend on the axis of the rear shell 3. The power piston 8 protrudes a sliding cylindrical portion 8b backward from the base portion 8a, and the sliding cylindrical portion 8b passes through the through hole 3b to protrude backward from the protruding portion 3a of the rear shell 3. A sealing element 9 is interposed between the internal surface of the through hole 3b and the outer surface of the sliding cylindrical portion 8b to block the variable pressure chamber 6 air-tightly from the atmosphere.

Referring again to FIG. 1, a numeral 11 denotes a master cylinder, which at its rear end portion 11a, passes through a center hole formed at the center portion of the front shell 2 to air-tightly protrude into the vacuum chamber 5, with a flange portion 11b thereof being in abutting engagement with the front end surface of the front shell 2. The front shell 2 and the rear shell 3 are joined with each other with several (e.g., two) tie rods 12, each of which extends in parallel with the axis of the housing 1 composed of the both shells 2, 3 at almost radial mid position between the axis and the outer surface of the housing 1, and are secured to the master cylinder 11. A sliding hole of each sealing portion formed on the diaphragm 4 is fitted on each tie rod 12 to be air-tightly slidable therealong as it keeps the air-tight partitioning between the vacuum chamber 5 and the variable pressure chamber 6.

A master piston 13, which is inserted into the master cylinder 11 slidably in the forward-backward direction, protrudes from the rear end portion of the master cylinder 11 into the vacuum chamber 5 to extend close to the front end of the power piston 8. An output rod 14 is interposed between the power piston 8 and the master piston 13. The power piston 8 transmits the output of the diaphragm 4 depending on the pressure difference between the vacuum chamber 5 and the variable pressure chamber 6, to the output rod 14 through a reaction member 17 thereby to make the output rod 14 push the master piston 13 forward. A return spring 16 is interposed between the front shell 2 and the front end surface of the power piston 8 to urge the power piston 8 backward.

As shown in FIG. 2, a reaction force chamber hole 8c, an engaging member receiving hole 8d being smaller in diameter than the reaction force chamber hole 8c, a plunger receiving hole 8e and a valve member receiving hole 8f being larger in diameter than the plunger receiving hole 8e are formed in the power piston 8 in series from the front end surface toward the rear end surface of the power piston 8 on the axis of the same. An annular recess 8n which continues at its internal surface on the outer side to the internal surface of the reaction force chamber hole 8c is axially formed on the bottom surface of the reaction force chamber hole 8c. An annular protrusion 14a formed at the rear end of the output rod 14 is inserted into the annular recess 8n to be relatively movable in the axis direction. Thus, a reaction force chamber 15 is defined to be surrounded by the rear end surface of the output rod 14, the internal surface of the annular protrusion 14a and the bottom surface of the reaction force chamber 8c, and a disc-like reaction disc 17 made of an elastic material is received in the reaction force chamber 15. Further, a numeral 21 designates a plunger which is received in the plunger receiving hole 8e to be movable in the forward-backward direction, and an atmosphere valve seat 21a is formed at the circumferential edge portion of an expansion portion which is formed at the rear end portion of the plunger 21. A front end rod portion 21b of the plunger 21 is inserted into a through hole 8i, which is formed in the base portion 8a of the power piston 8 to pass through the reaction force hole 8c and the engaging member receiving hole 8d, and the front end surface of the front end rod portion 21b is in contact with the rear end surface of an abutting member 19 fitted slidably in the through hole 8i. The reaction force chamber 15, the reaction disc 17, the front end rod portion 21b of the plunger 21, the through hole 8i and the like constitute reaction force applying means 33 for transmitting a part of the reaction force of the output rod 14 to the input rod 23.

A numeral 22 denotes a lever member taking the shape of "H" letter, and the movement amount of the plunger 21 relative to the power piston 8 is restricted by the lever member 22. Straight portions formed at the both sides of the lever member 22 have their inner side surfaces which partly get in an annular engaging groove 21c formed on the plunger 21 to be relatively movable by a predetermined amount in the forward-backward direction. The straight portions of the key member 22 are in slidable contact at their outer side surfaces with rectangular holes 8p, 8q, which are radially formed at one side wall and the other side wall of the engaging member receiving hole 8d and extend both end portions radially outwardly of the power piston 8. The dimension of the thickness of the lever member 22 in the forward-backward direction is made to be smaller than the dimension of the rectangular hole 8p in the forward-backward direction, so that the power piston 8 and the plunger 21 are relatively movable by a predetermined distance in the axial direction and so that the lever member 22 is able to incline relative to the power piston 8. When the lever member 22 is inclined relative to the power piston 8, a rear edge portion of the portion where the rectangular hole 8p opens to the internal surface of the engaging member receiving hole 8d serves as a fulcrum point 8r of the power piston 8 which supports a portion (hereafter referred to as fulcrumed portion) on one end side of the lever member 22 to be inclinable. The lever member 22 is inclined with the fulcrumed portion being supported on the fulcrum point 8r of the power piston 8 and is inclinable until the inclination motion is stopped upon contact with a front edge portion of the portion where the rectangular hole 8p opens to the external surface of the sliding cylindrical portion 8b. The rectangular hole 8q is elongated backward to permit the inclination of the lever member 22.

Further, the lever member 22 is able to abut on the end surface of the protruding portion 3a of the rear shell 3 at their opposite ends protruding from the external surface of the power piston 8. The front end surfaces of the rectangular holes 8p, 8q are brought into contact with the lever member 22 which is being prevented from retracting relative to the housing 1 in this way, to stop the power piston 8 at the retracted position, and the front end surface of the engaging groove 21c is brought into contact with the lever member 22 to stop the plunger 21 at the retracted position. In this way, the lever member 22 also functions as a key member for restricting the retraction of the plunger 21 relative to the housing 1.

The rear end of the plunger 21 is connected to the input rod 23 as the same is swingable relative to the plunger 21. The input rod 23 passes through a filter element 24, extends backward beyond the sliding cylindrical portion 8b and is connected to a brake pedal 25 (shown in FIG. 1) in a usual manner. The plunger 21 and the input rod 23 constitute an input member 32 which is axially movable by the brake pedal 25. A bellows 26 is secured between the input rod 23 and the protruding portion 3a of the rear shell 3 to cover the external surface of the sliding cylindrical portion 8b of the power piston 8.

As shown in FIG. 2, a valve mechanism 30 is further provided for making the variable pressure chamber 6 communicate selectively with the vacuum chamber 5 or the atmosphere. The valve mechanism 30 is composed of the atmosphere valve seat 21a and a vacuum valve seat 27 which are provided respectively on the plunger 21 and the power piston 8, an atmosphere valve 31a brought selectively into contact with or separation from the atmosphere valve seat 21a for bringing the variable pressure chamber 6 selectively into communication with the atmosphere or isolation from the same, and a vacuum valve 28 brought selectively into contact with or separation from the vacuum valve seat 27 for bringing the variable pressure chamber 6 selectively into communication with the vacuum chamber 5 or isolation from the same. The atmosphere valve 31a and the vacuum valve 28 are provided on a disc-like valve member 31 which is received within the valve member receiving hole 8f to be movable in the forward-backward direction.

That is, on a stepped portion formed between the plunger receiving hole 8e and the valve member receiving hole 8f of the power piston 8, two flat surfaces are defined each taking the shape of a curved, elongate circle, and two fixed vacuum valve seats 8k are protruded from the two flat surfaces to be symmetrical with respect to the axis of the power piston 8. Each fixed vacuum valve seat 8k is formed on each flat surface and takes the shape of a closed loop ridge or ledge protruding along the circumference of each ellipse which is curved or crooked along an arc having the center on the axis of the power piston 8. Passages 8m surrounded by the fixed vacuum valve seats 8k pass through the side wall of the power piston 8 to open to the vacuum chamber 5.

A numeral 40 denotes a movable valve seat member surrounding the plunger 21, and the backward cylindrical portion 40a of the movable valve seat member 40 is axially slidably fitted in the internal surface of a large diameter portion of the plunger receiving hole 8e of the power piston 8 with a seal element 41 air-tightly provided therebetween. The cylindrical portion 40a of the movable valve seat member 40 is provided at its rear end with a movable vacuum valve seat 40b surrounding the atmosphere valve seat 21a, and in the non-braking state, the movable vacuum valve seat 40b is positioned to be slightly advanced beyond the fixed vacuum valve seats 8k, so that it does not contact with the valve member 31 in the non-braking state. As shown at the lower-half in FIG. 2, the rear end of the cylindrical portion of the movable valve seat member 40 is partly expanded in the radial direction at two positions each of which is circumferentially different from the fixed vacuum valve seats 8k, that is, circumferentially between the two fixed vacuum valve seats 8k, and the movable valve seat member 40 defines a pair of air leading portions 40c at the two radially expanded portions thereof. Thus, when the atmosphere valve seat 21a is separated from the atmosphere valve 31a, the atmospheric air mainly passes through the air leading portions 40c to be admitted into the movable valve seat member 40. In order to position the movable valve seat member 40 on the side of the valve member 31 beyond the fixed vacuum valve seats 8k, a compression spring 43 as urging means for urging the movable valve seat member 40 backward is interposed between an end surface of the cylindrical portion 40a of the movable valve seat member 40 and a spring seat surface formed on the internal surface of the plunger receiving hole 8e.

The movable valve seat member 40 is provided at its front end portion with an annular engaging portion 40d which is slidably fitted on a large diameter portion formed on the front end rod portion 21b of the plunger 21. The engaging portion 40d and the cylindrical portion 40a are joined by two linking portions 40e. At the radial opposite sides of the front end rod portion 21b, the two linking portions 40e are put between the both straight portions of the lever member 22 taking the shape of "H" letter, and the movable valve seat member 40 is prevented from coming off in such a manner that a cross beam portion of the lever member 22 is kept contacted with the outer surface of one of the linking portions 40e while engaging portions formed on the inner side surfaces of the both straight portions are kept engaged with the outer surface of the other linking portion 40e. Further, the engaging portion 40d of the movable valve seat member 40 is engaged with a mid portion of the lever member 22, so that the movable valve seat member 40 is prevented by the lever member 22 from moving rearward relative to the same. The movable valve seat member 40 is prevented from rotation and keeps the pair of air leading portions 40c at the same angular phase as the lever member 22 to be located between the two fixed vacuum valve seats 8k in the circumferential direction. The two linking portions 40e pass through communication grooves, formed in the plunger 21 in the axial direction of the same, to extend from the plunger receiving hole 8e to the engaging member receiving hole 8d.

Formed at the front end surface of the valve member 31 are first vacuum valves 31b of a flat shape, which are brought selectively into contact with or separation from the fixed vacuum valve seats 8k for bringing the variable pressure chamber 6 selectively into communication with the vacuum chamber 5 or isolation from the same. The front end surface of the valve member 31 has formed a second vacuum valve 31c of a flat shape at a portion which is smaller in diameter than the first vacuum valves 31b. The second vacuum valve 31c is selectively brought into contact with or separation from the movable vacuum valve seat 40b which has been retracted beyond the fixed vacuum valve seats 8k, for selectively making the variable pressure chamber 6 communicate with the vacuum chamber 5 or isolated therefrom. Further, the front end surface of the valve member 31 is annually provided with the atmosphere valve 31a at a portion which is smaller in diameter than the second vacuum valve 31c.

Figure 3:
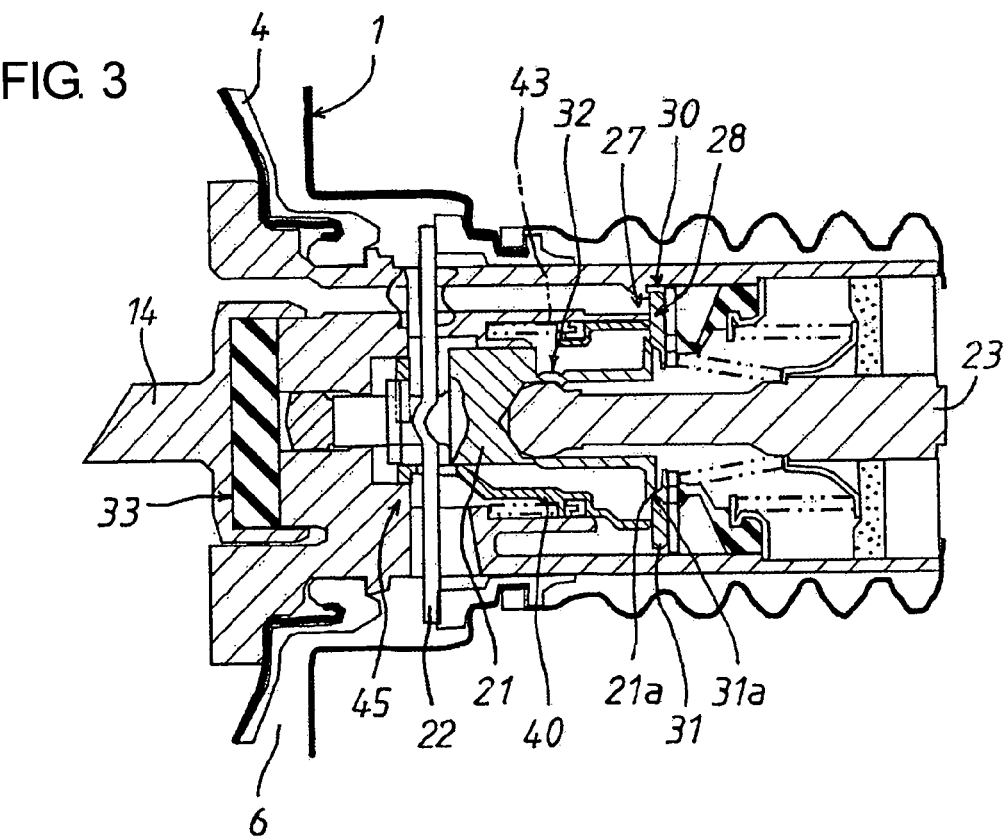
FIG. 3 is an enlarged fragmentary sectional view of the valve mechanism section showing the state that a movable vacuum valve sheet is about to retract.

As shown in FIGS. 2 and 3, the rear end of the valve member 31 is connected to an annular holder 35 by means of a bellows 34 which allows the valve member 31 to move in the axial direction. The holder 35 is fitted in the internal surface of the valve member receiving hole 8f and is urged by means of the resilient force of a compression spring 36 which is interposed between itself and a spring shoe protruded at the axial mid portion of the input rod 23, to be pressured on a stepped shoulder portion of the valve member receiving hole 8f. Between the spring shoe provided on the input rod 23 and the rear end surface of the valve member 31, a compression spring 37 is interposed to urge the valve member 31 forward. The plunger receiving hole 8e and the engaging member receiving hole 8d are in communication with the variable pressure chamber 6 through a communication groove, provided in the axial direction of the plunger 21, and the rectangular holes 8p, 8q.

The foregoing vacuum valve seat 27 is composed of the fixed vacuum valve seats 8k provided in the power piston 8 and the movable vacuum valve seat 40b formed on the movable valve seat member 40 which is air-tightly fitted in the internal surface of the power piston 8 to be movable in the forward-backward direction, while the vacuum valve 28 is composed of the first and second vacuum valves 31b, 31c provided on the valve member 31. Further, vacuum valve seat retracting means 45 is composed of the movable valve seat member 40, the compression spring 43 for urging the movable valve seat member 40 backward relative to the power piston 8, the lever member 22 passing radially through the power piston 8 through the rectangular holes 8p, 8q, and the like. Thus, when the advance of the input member 32 causes the atmosphere valve seat 21a to separate from the atmosphere valve 31a thereby to advance the power piston 8, the position of the vacuum valve 27 is retracted relative to the power piston 8 by a distance to which the advance amount of the power piston 8 relative to the housing 1 is decreased at a predetermined ratio.

(Operation)

The operation of the vacuum type booster device as constructed above in the foregoing embodiment will be described hereinafter. FIGS. 1 and 2 shows the state that the brake pedal 25 is not being stepped, in which state the valve mechanism 30 is held in an output power decreasing action state to make the variable pressure chamber 6 communicate with the vacuum chamber 5 and isolated from the atmosphere. Specifically, the input member 32 and the power piston 8 are in contact with the lever member 22 being in contact with the housing 1, and the atmosphere valve seat 21a is in contact with the atmosphere valve 31a to hold the fixed vacuum valve seats 8k in a state being separated by a predetermined amount from the first vacuum valves 31b, so that the variable pressure chamber 6 is lowered to the same pressure as that in the vacuum chamber 5.

Accordingly, no advance force is acting on the diaphragm 4 and the power piston 8 as movable members, which have therefore been retracted by means of the resilient force of the return spring 16, and the power piston 8 is held at the retracted end with the lever member 22 being in contact with the stepped portion inner surface of the protruding portion 3a of the rear shell 3. At this time, the engaging portion 40d of the movable valve seat member 40 is in engagement with the mid portion of the lever member 22, and the movable vacuum valve seat 40b is at the position (the point (a) in FIG. 6) where it has been beforehand advanced by a predetermined amount beyond the fixed vacuum valve seats 8k.

When the input rod 23 and the plunger 21 are then advanced by the stepping of the brake pedal 25 against the resilient force of the compression spring 36, the valve member 31 is advanced by the resilient force of the compression spring 37. This brings the first vacuum valves 31b respectively into contact with the fixed vacuum valve seats 8k thereby to block the communication between the variable pressure chamber 6 and the vacuum chamber 5. Thus, the valve mechanism 30 is switched from the output power decreasing action state to an output power holding action state. As the input member 32 is advanced further, the atmosphere valve seat 21a is separated from the atmosphere valve 31a, whereby the atmospheric air filtered by the filter element 24 is admitted into the variable pressure chamber 6 through the rectangular holes 8p, 8q to switch the valve mechanism 30 to an output power increasing action state. As a result of the valve mechanism 30 switched to the output power increasing action state, the atmospheric air flows into the variable pressure chamber 6 to increase the pressure within the variable pressure chamber 6, whereby an advance force depending on the pressure difference between the variable pressure chamber 6 and the vacuum chamber 5 is generated on the diaphragm 4. The advance force is transmitted from the power piston 8 to the output rod 14 through the reaction disc 17, and the diaphragm 4, the power piston 8 and the output rod 14 begin to advance bodily relative to the housing 1 to start the operation of the master cylinder 11. With the advance of the power piston 8 relative to the input member 32, the atmosphere valve 31a of the valve member 31 is again brought into contact with the atmosphere valve seat 21a to block the communication with the atmosphere, whereby the flowing of the atmospheric air into the variable pressure chamber 6 is blocked to switch the valve mechanism 30 into the output power holding state.

Since the lever member 22 is urged backward by the compression spring 43 through the movable valve seat member 40 at the early stage of the advance of the power piston 8, it remains contacted with the housing 1 and the movable valve seat member 40 is held at the retracted position. During this period of time, the fixed vacuum valve seats 8k act as the vacuum valve seat 27 and is held in contact with the first vacuum valves 31b acting as the vacuum valves 28, so that it results that the vacuum valve seat 27 is moved by the same distance as the power piston 8 is done. That is, the retraction amount of the vacuum valve seat 27 relative to the power piston 8 is null, so that the operation during the period becomes the same operation as done by a conventional vacuum type booster device which does not have the function to shorten the operation stroke of the input member 32.

When the driver increases the manipulation amount of the brake pedal 25, the valve mechanism 30 is switched to the output power increasing action state, whereby the atmospheric air flows into the variable pressure chamber 6 to exert the advance force on the diaphragm 4. Thus, the power piston 8 is advanced relative to the housing 1, and when the clearance between the fulcrum point 8r of the power piston 8 and the lever member 22 becomes null (the state shown in FIG. 3 and the point (b) in FIG. 6), the lever member 22 begins to incline about the fulcrum point 8r. That is, the lever member 22 is held to be inclinable about the fulcrum point 8r of the power piston 8 on its one end side, is in contact with the housing 1 at the other end portion thereof and is engaged with the engaging portion 40d of the movable valve seat member 40 at the mid portion thereof. Thus, because the movable vacuum valve seat 40b is retracted relative to the power piston 8 by the distance to which the advance amount of the power piston 8 relative to the housing 1 is decreased at the predetermined lever ratio, the position of the movable vacuum valve seat 40b is gradually moved backward relative to the fixed vacuum valve seats 8k. The predetermined lever ratio is the ratio of the distance between the fulcrumed portion on one end side of the lever member 22 supported at the fulcrum point 8r and the mid portion engaged with the movable valve seat member 40, to the distance between the fulcrumed portion of the lever member 22 and the other end portion of the lever member 22 contacting with the housing 1.

Figure 6:
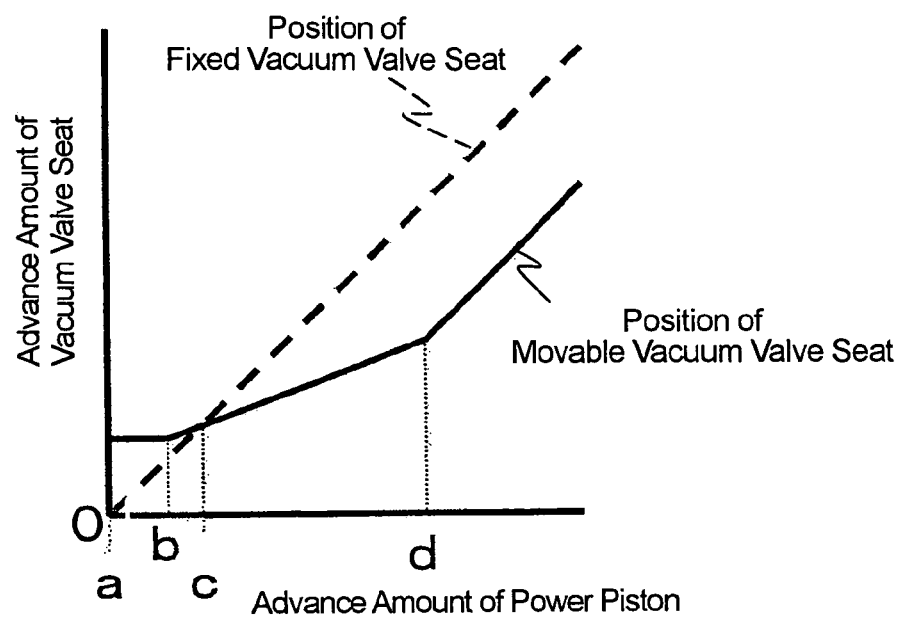
FIG. 6 is a graph showing the relation between the movements of a power piston and the vacuum valve sheet.

As the movable vacuum valve seat 40b is retracted relative to the power piston 8, it is retracted soon beyond the fixed vacuum valve seats 8k (the point (c) in FIG. 6). Then, the valve member 31 is moved backward against the resilient force of the compression spring 37 to make the atmosphere valve 31a separate further from the atmosphere valve seat 21a. Accordingly, the opening degree of the atmosphere valve 31a is increased, whereby the pressure within the variable pressure chamber 6 is further heightened to advance the diaphragm 4, the power piston 8 and the output rod 14 further relative to the housing 1. In short, the power piston 8 and the output rod 14 become larger in advance amount than the input member 32. Since the increase of the advance amount takes place gradually in proportion to the advance amount of the input member 32, it is unlikely that there is generated an impact or shock which would cause the driver to feel unpleasantly. In this course of operation, the reaction disc 17 is compressively deformed by the power piston 8 and the output rod 14 to enter the through hole 8i of the power piston 8.

Until contact begins between the reaction disc 17 entering the through hole 8i and the front end rod portion 21b of the plunger 21, the input power remains not to vary but the output power only increases, whereby there comes a state well-known in the art to be called "jump up". After the contact of the reaction disc 17 with the input member 32, a reaction force depending on the output power from the output rod 14 is exerted on the input member 32 in such a direction as to retract the input member 32 relative to the power piston 8.

Since the retraction of the movable vacuum valve seat 40b results in an increase in the deformation amount which is necessary for the reaction disc 17 to come into contact with the input member 32, the input-output characteristic is changed. Concretely, the increase of the necessary deformation amount of the reaction disc 17 causes the reaction force onto the input member 32 to decrease, the result of which is that the output power depending on the same input power increases. Where the characteristic change is one desired, the characteristic is let to remain as it is. However, where the tendency for the output power to increase is to be repressed, the output power increase tendency can be regulated by adjusting the shape of the surface of the power piston 8 at which the same contacts with the reaction disc 17, as disclosed in the foregoing Application Publication.

Figure 4:
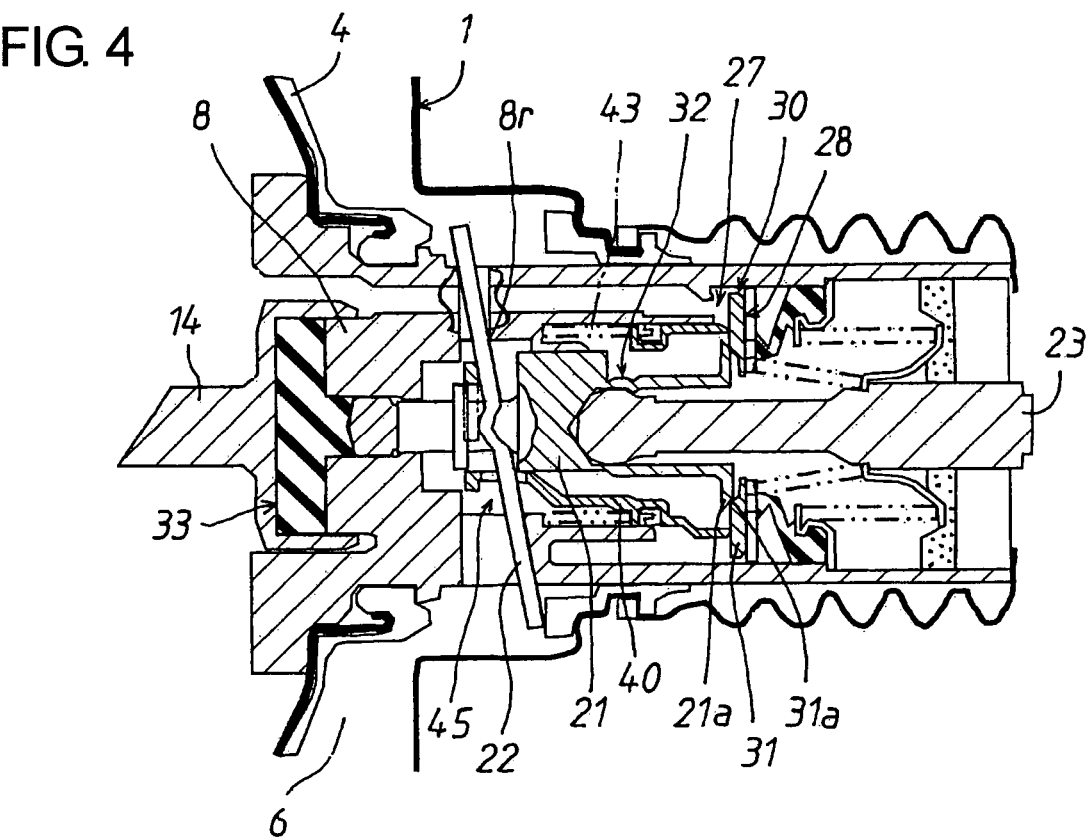
FIG. 4 is an enlarged fragmentary sectional view of the valve mechanism section showing the state that the movable vacuum valve sheet completes retraction.

When the power piston advances further, the lever 22 comes into contacts with the rectangular holes 8p, 8q respectively at the front and rear end surfaces thereof to be prevented from being further inclined (the state in FIG. 4, the point (d) in FIG. 6). In this state, the movable vacuum valve seat 40b has been retracted by a predetermined amount beyond the fixed vacuum valve seats 8k, and the further advance of the power piston 8 causes the lever member 22 and the movable vacuum valve seat 40b to advance bodily with the power piston 8. In this manner, it can be realized to gradually increase the operation stroke of the output rod 14 by the predetermined amount over the operation stroke of the input member 32. As a consequence, the output rod 14 can have an operation stroke which is necessary at a part of an early stage in stepping the brake pedal 25 which part is called a "play" on the side of output members such as the master cylinder and the like, so that the operation stroke of the input member can be shortened. During this period of time, the movable vacuum valve seat 40b serves as the vacuum valve seat 27 and come into contact with the second vacuum valve 31c serving as the vacuum valve 28.

Figure 5:
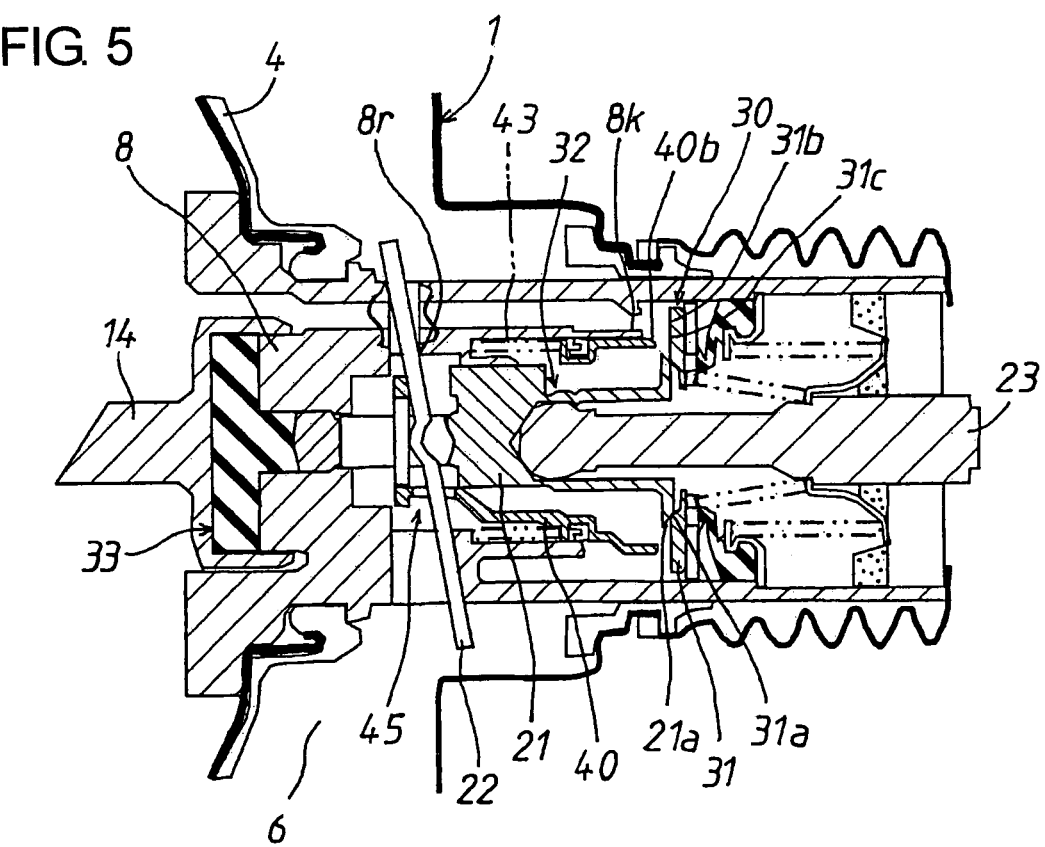
FIG. 5 is an enlarged fragmentary sectional view of the valve mechanism section in the quick braking release state.

At the time of braking release, the input member 32 is retracted by releasing the brake pedal 25. The atmosphere valve seat 21a comes into contact with the atmosphere valve 31a to move the valve member 31 backward against the resilient force of the compression spring 37, whereby the second vacuum valve 31c is separated from the movable vacuum valve seat 40b to bring the vacuum chamber 5 and the variable pressure chamber 6 into communication. In particular, when the brake pedal 25 is returned quickly, the input member 32 is retractable relative to the power piston 8 until the lever member 22 is prevented from being inclined further upon contact of the lever member 22 with the rectangular holes 8p, 8q of the power piston 8 respectively at the front and rear end surfaces (the state shown in FIG. 5). In this state, the opening amount between the second vacuum valve 31c and the movable vacuum valve seat 40b becomes equal approximately to the difference in position between the fixed vacuum valve seats 8k and the movable vacuum valve seat 40b in the state shown in FIG. 2 wherein the valve mechanism 30 is in the non-braking state. Even where the lever member 22 is used to position the movable vacuum valve seat 40b, making the loss stroke at the early stage smallest and sufficiently securing the opening amount between the second vacuum valve 31c and the movable vacuum valve seat 40b at the time of braking release can stand together by positioning the movable vacuum valve seat 40b at a position advanced beyond the fixed vacuum valve seats 8k in the non-braking state in the manner as aforementioned. As the braking release continues as it goes, the operation state comes close to the non-braking state shown in FIG. 2 by way of a process opposite to that at the time of piston advance, and in the course of the process, the opening amount becomes small between the fixed vacuum valve seats 8k and the first vacuum valves 31b, the operation of which is quite the same as that in the conventional vacuum type booster device which does not have any mechanism for shortening the operation stroke of the input member 32.

FIG. 6 represents in the form of a graph the movement of the power piston 8 and the movements of the fixed vacuum valve seats 8k and the movable vacuum valve seat 40b in the process of stepping the brake pedal 25. The movement during which the position of the movable vacuum valve seat 40b is retracted relative to the power piston 8 by the moving amount to which the advance amount of the power piston 8 is decreased at the predetermined ratio is indicated in the graph as a line segment which rises from left to right at a smaller angle than 45 degrees of the solid line representing the movement of the movable vacuum valve seat 40b.

Second Embodiment

Next, a vacuum type booster device in a second embodiment will be described with reference to FIGS. 7 and 8. Because the device in the second embodiment differs only in the vacuum valve seat retracting means 45 from that in the first embodiment, the following description will be addressed mainly to the difference, and other parts or components are given the same reference numerals as those in the first embodiment instead of omitting the detailed description therefor.

In the second embodiment, a key member 50 taking almost the same shape as the foregoing lever member 22 is used to restrict the relative moving amount of the plunger 21 relative to the power piston 8. Straight portions formed at the both sides of the key member 22 have their inner side surfaces which partly get in the annular engaging groove 21c formed on the plunger 21 to be movable by a predetermined distance in the forward-backward direction. The straight portions of the key member 22 pass through two rectangular holes 8s, which are formed on radially opposite sides of the engaging member receiving hole 8d, as they are guided at outer side surfaces thereof along the rectangular holes 8s, and extend opposite end portions thereof radially outwardly of the power piston 8. The dimension in thickness of the key member 22 is made to be smaller than the dimension in the forward-backward direction of the rectangular holes 8s, so that the power piston 8 and the plunger are able to move relatively by a predetermined distance in the axial direction.

The vacuum valve seat retracting means 45 is composed of the first spring 43 for urging the movable valve seat member 40 backward relative to the power piston 8 and a second spring 52 for urging the movable valve seat member 40 forward relative to the housing 1. The second spring 52 is interposed between the housing 1 and the key member 50, and the load of the second spring 52 in the closed state is designed to be smaller than the load which the first spring 43 has when set.

The operation of the vacuum type booster device in the second embodiment will be described hereinafter. In the non-braking state shown in FIG. 7 wherein the brake pedal 25 is not being stepped, the power piston 8 is urged backward by the return spring 16 and is positioned to the retracted end by the key member 50 riding on the second spring 52 which has been compressed to the closed state, and the input member 32 is also positioned by the key member 50 to the retracted end. In this state, the atmosphere valve seat 21a is in contact with the atmosphere valve 31a, and the fixed vacuum valve seats 8k are held separated a slight amount from the first vacuum valve seats 31b, so that the pressure within the variable pressure chamber 6 has been lowered to the same pressure as that within the vacuum chamber 5. At this time, the movable vacuum valve seat 40b of the movable valve seat member 40 being engaged with the key member 50 takes a position at which it has advanced by the predetermined amount beyond the fixed vacuum valve seats 8k (the point (a) in FIG. 6).

When the driver manipulates the brake pedal 25 to advance the input rod 23 against the compression spring 36, the valve mechanism 30 operates in the same manner as described in the first embodiment, whereby the power piston 8 is advanced. At the early stage of the advance, the key member 50 is urged backward by the first spring 43 through the movable valve seat member 40 while it is urged forward by the second spring 52. At this step, since the resilient force of the first spring 43 is stronger than the load of the second spring 52 in the closed state, the key member 50 and the movable valve seat member 40 or the movable vacuum valve seat 40b are held at their retracted ends. During this time, the fixed vacuum valve seats 8k act as the vacuum valve seat 27, and thus, it results that the vacuum valve seat 27 advances the same amount as the power piston 8 does. That is, the vacuum valve seat 27 is null in its retraction amount relative to the power piston 8, so that the vacuum type booster device performs the same operation as done by the conventional device which does not have the function of shortening the operation stroke of the input member 32.

When the driver increases the manipulation amount of the brake pedal 25, the power piston 8 is advanced relative to the housing 1, so that the valve member 31 which advances almost bodily with the power piston 8 comes into contact with the movable vacuum valve seat 40b remaining at the original position (the point (b) in FIG. 6). Where symbols k1 and k2 are taken respectively as the spring constants of the first spring 43 and the second spring 52 and where symbols Δx and Δy are taken respectively as the advance amount of the power piston 8 and the retraction amount of the movable vacuum valve seat 40b from a certain time point, the resilient force of the first spring 43 decreases by the force of k1×Δy during that period, while the resilient force of the second spring 52 decreases by the force of k2×(Δx−Δy) during the same period. For the balance to be held during this period or thereabout, there holds an expression Δy=k2× Δx/(k1+k2). That is, the position of the movable vacuum valve seat 40b is moved backward relative to the power piston 8 by the distance to which the advance amount of the power piston 8 relative to the housing 1 is decreased at a predetermined ratio determined by the spring constants of the first and second springs 43, 52. In this manner, the movable vacuum valve seat 40b is moved backward relative to the power piston 8, and thus, also in the second embodiment, the operation stroke of the output rod 14 is made to be shorter than the operation stroke of the input member 32 similarly to the first embodiment.

For the purpose of brevity, the foregoing description does not include the influence of the vacuum force. However, where the influence of the vacuum force causes the movable vacuum valve seat 40b to shift its position in practice, such can be solved by adjusting the close-state load and the spring constant k2 of the second spring 52.

Figure 8:
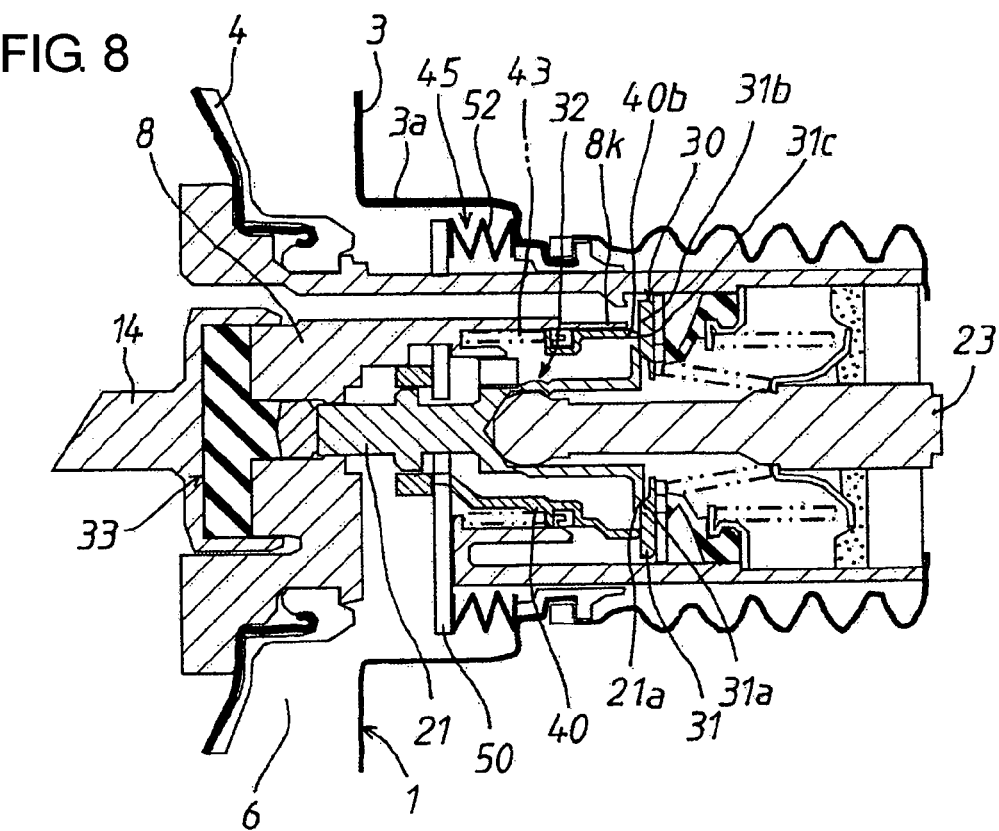
FIG. 8 is an enlarged fragmentary sectional view of the valve mechanism section shown in FIG. 7 showing the state that a movable vacuum valve sheet completes retraction.

When the power piston 8 is advanced further, the key member 50 comes to contact with the power piston 8 (the state shown in FIG. 8, the point (d) in FIG. 6). In this state, the movable vacuum valve seat 40b has been retracted to the largest relative to the power piston 8, so that when the power piston 8 is advanced still further, the key member 5 and the movable vacuum valve seat 40b are advanced bodily with the power piston 8.

In the foregoing first and second embodiments, the valve mechanism 30 in the non-braking state is held in the output power decreasing action state wherein the variable pressure chamber 6 is in communication with the vacuum chamber 5 and is blocked from the atmosphere. In a modified form, the valve mechanism 30 in the non-braking state may be held in the output power holding action state wherein the variable pressure chamber 6 is blocked from the vacuum chamber 5.

Third Embodiment

Next, a vacuum type booster device in a third embodiment will be described with reference to FIGS. 9 through 16. Because the device in the third embodiment differs in the shape of the valve member 31 and the vacuum valve seat retracting means 45 from those in the first embodiment, the following description will be addressed mainly to the differences, and other parts or components are given the same reference numerals as those in the first embodiment instead of omitting the detailed description therefor.

The valve mechanism 30 includes a cylindrical valve member 31 which is received in the valve member receiving hole 8f with a play. The valve member 31 is provided at a front surface of its front wall portion 31f with a vacuum valve 28 which is selectively brought into contact with, or separation from, a vacuum valve seat 27 to make the variable pressure chamber 6 communicate with, or blocked from, the vacuum chamber 5 and is also provided at the front surface of its rear wall portion 31r with an atmosphere valve 31a which is selectively brought into contact with, or separation from, the atmosphere valve seat 21a to make the variable pressure chamber 6 communicate with, or blocked from, the atmosphere. In the same manner as the first embodiment, the movable valve seat member 40 is axially movably fitted in the large diameter portion of the plunger receiving hole 8e of the power piston 8 with itself being sealed air-tightly and is urged backward by the compression spring 43 as the first spring. The movable valve seat member 40 is provided at its front end portion with the annular engaging portion 40d which is slidably fitted on the large diameter portion formed on the front end rod portion 21b of the plunger 21, and the engaging portion 40d and the cylindrical portion 40a are joined by the two linking portions 40e. At the radial opposite sides of the front end rod portion 21b, the two linking portions 40e are put between the both straight portions of a key member 55. Further, the engaging portion 40d of the movable valve seat member 40 is engaged with a mid portion of the key member 55 to restrict the backward movement of the movable valve seat member 40 relative to the key member 55. The vacuum valve seat 27 is composed of the fixed vacuum valve seats 8k provided in the power piston 8 and the movable vacuum valve seat 40b formed on the cylindrical portion 40a of the movable valve seat member 40, while the vacuum valve 28 is composed of the first and second vacuum valves 31b, 31c provided on the front wall portion 31f of the valve member 31.

Figure 10:
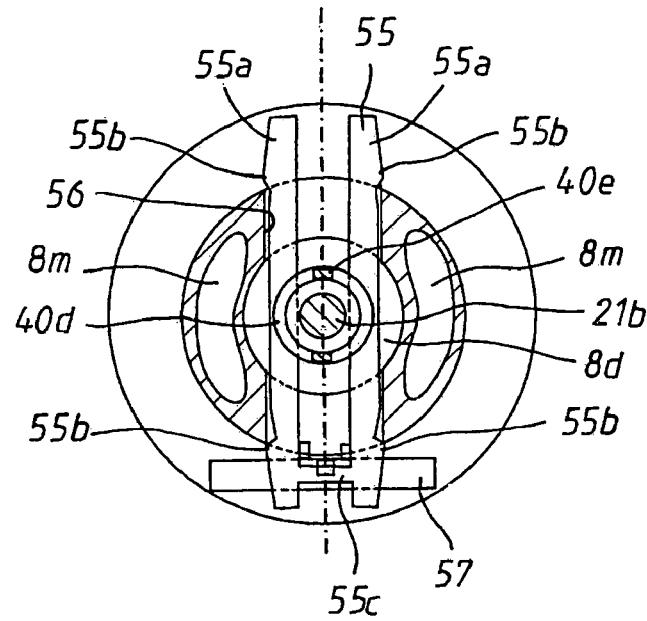
FIG. 10 is a cross-sectional view taken along the line 10-10 in FIG. 9 showing a portion receiving a key member.
Figure 11:
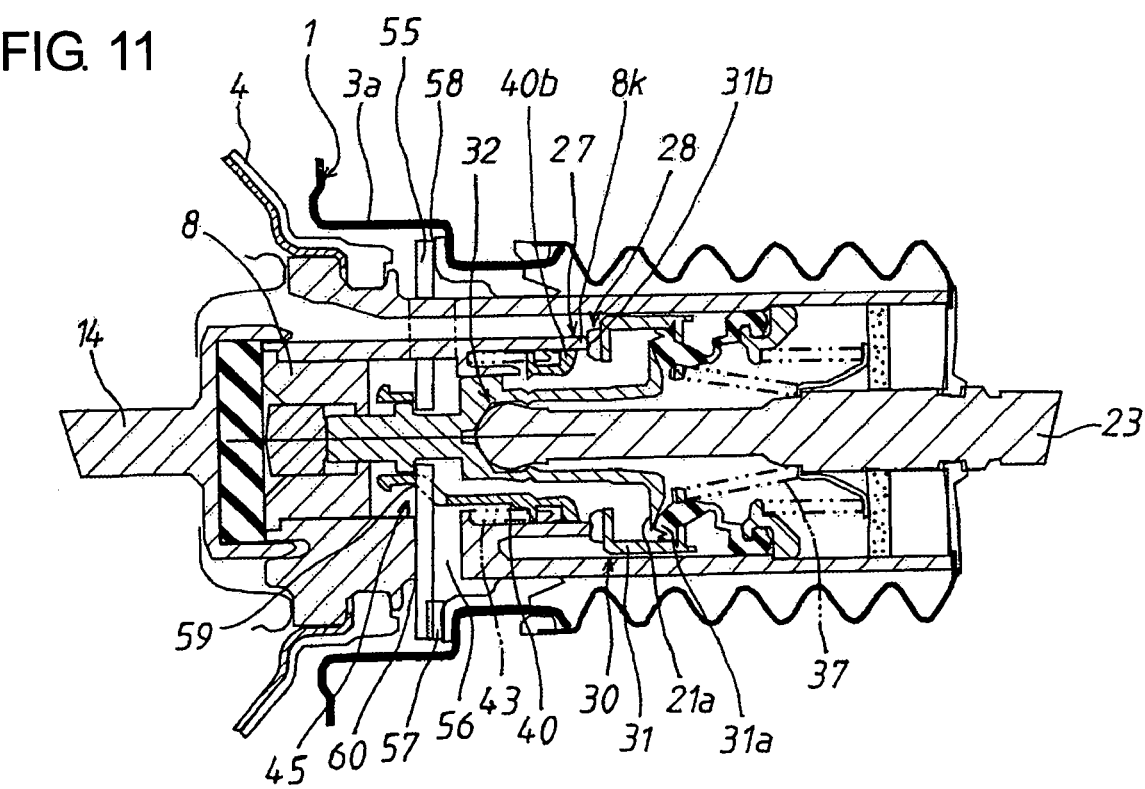
FIG. 11 is an enlarged fragmentary sectional view of the valve mechanism section showing the state that a key member is in contact with a housing and the front wall of a radial through hole.
Figure 12:
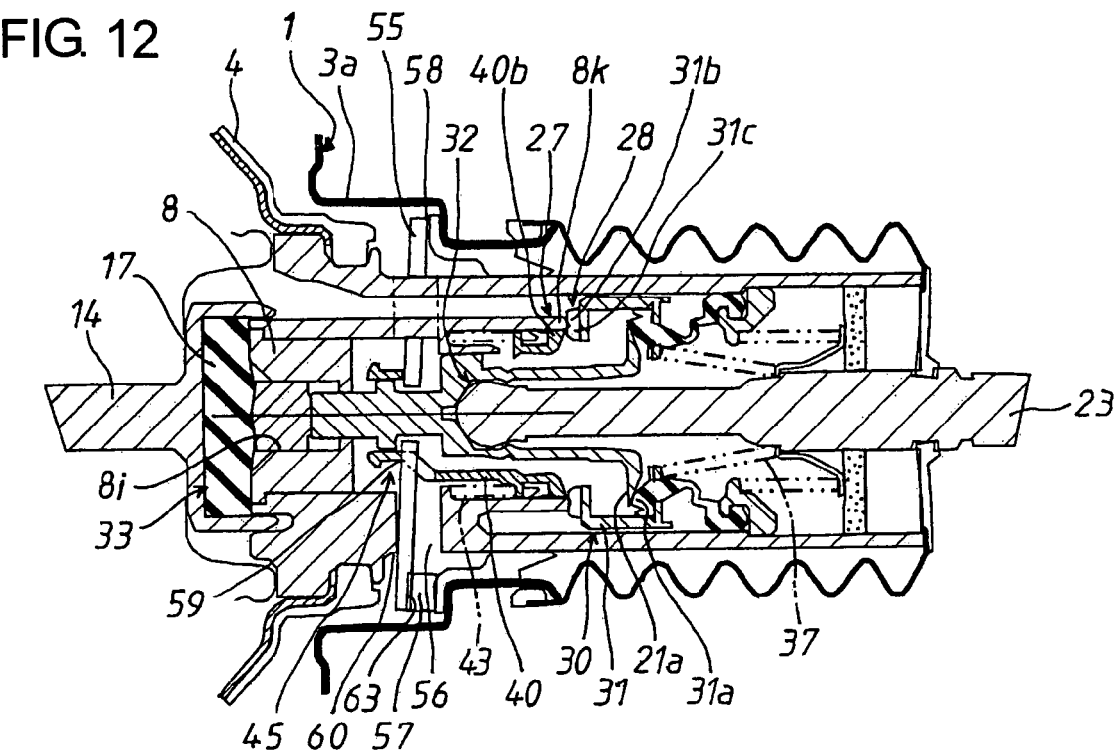
FIG. 12 is an enlarged fragmentary sectional view of the valve mechanism section in the third embodiment showing the state that the movable vacuum valve seat is retracted beyond fixed vacuum valve seats.
Figure 13:
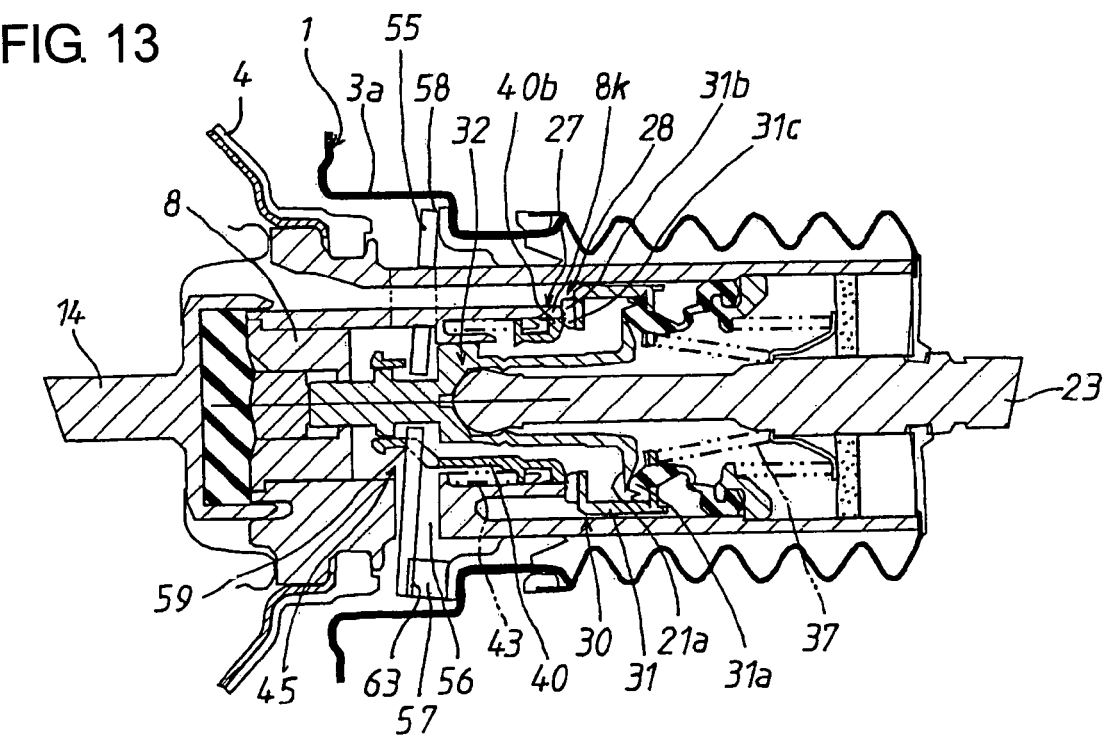
FIG. 13 is an enlarged fragmentary sectional view of the valve mechanism section showing the state that the key member goes off the front wall of the radial through hole on one end side.

Referring now to FIG. 10, the key member 55 taking the shape of "H" letter is provided to restrict the movement amount of the plunger 21 relative to the power piston 8. Straight portions 55a formed at the both sides of the key member 55 have their inner side surfaces which partly get in the annular engaging groove 21c formed on the plunger 21 to be relatively movable by a predetermined amount in the forward-backward direction. The straight portions 55a of the key member 55 are in slidable contact at their outer side surfaces with radial through holes 56 which are radially formed to open at one side wall and the other side wall of the engaging member receiving hole 8d and extend opposite end portions radially outwardly of the power piston 8. Four engaging portions 55b formed at the outside surface of the both straight portions 55a are engaged with end edges at the opposite ends of the radial through holes 56 to prevent the key member 55 from coming out of the power piston 8. A cross beam portion 55c joining the both straight portions 55a at one end portion of the key member 55 faces with the inner end surface of the protruding portion 3a of the rear shell 3 at one radial outer side of the power piston 8 and also faces with the inner end surface of the protruding portion 3a at the other radial outer side of the power piston 8. Thus, when the key member 55 is restricted from further retraction upon contact at the opposite end portions thereof with the inner end surface of the protruding portion 3a being the rear inner end surface of the housing 1, the front walls at radial opposite side of the radial through holes 56 come into contact with the key member 55 on one end side and the other end side of the same to stop the power piston 8 at the retracted end, and the front end surface of the engaging groove 21c comes into contact with the key member 55 to stop the plunger 21 at the retracted end. In this way, the key member 55 functions as a member for restricting the retraction of the plunger 21 relative to the housing 1. The dimension of the thickness of the key member 55 in the forward-backward direction is made to be smaller than the dimension of the radial through holes 56 in the forward-backward direction, so that the power piston 8 and the plunger 21 are relatively movable by a predetermined amount in the axial direction and so that the key member 55 is able to incline relative to the power piston 8.

A leaf spring 57 whose opposite end portions are bent toward the rear inner end surface of the housing 1 is fixed at its center portion onto the cross beam portion at one end portion of the key member 55. The leaf spring 57 functions as the second spring for urging the key member 55 forward relative to the housing 1. Further, the vacuum valve seat retracting means 45 is composed of the first spring 43 for urging the movable valve seat member 40 backward relative to the power piston 8, the key member 55 passing through the radial through holes 56 provided radially in the power piston 8 and having the opposite end portions face with the housing 1 and the mid portion engaged with the movable valve seat member 40, and the second spring 57 for urging one end portion of the key member 55 forward relative to the housing 1. Thus, the key member 55 is inclined upon contact with the housing 1 and the front wall or the rear wall of the radial through holes 56 in dependence on the position of the power piston 8 relative to the housing 1 as well as on the urging forces of the first and second springs 43, 57.

Figure 9:
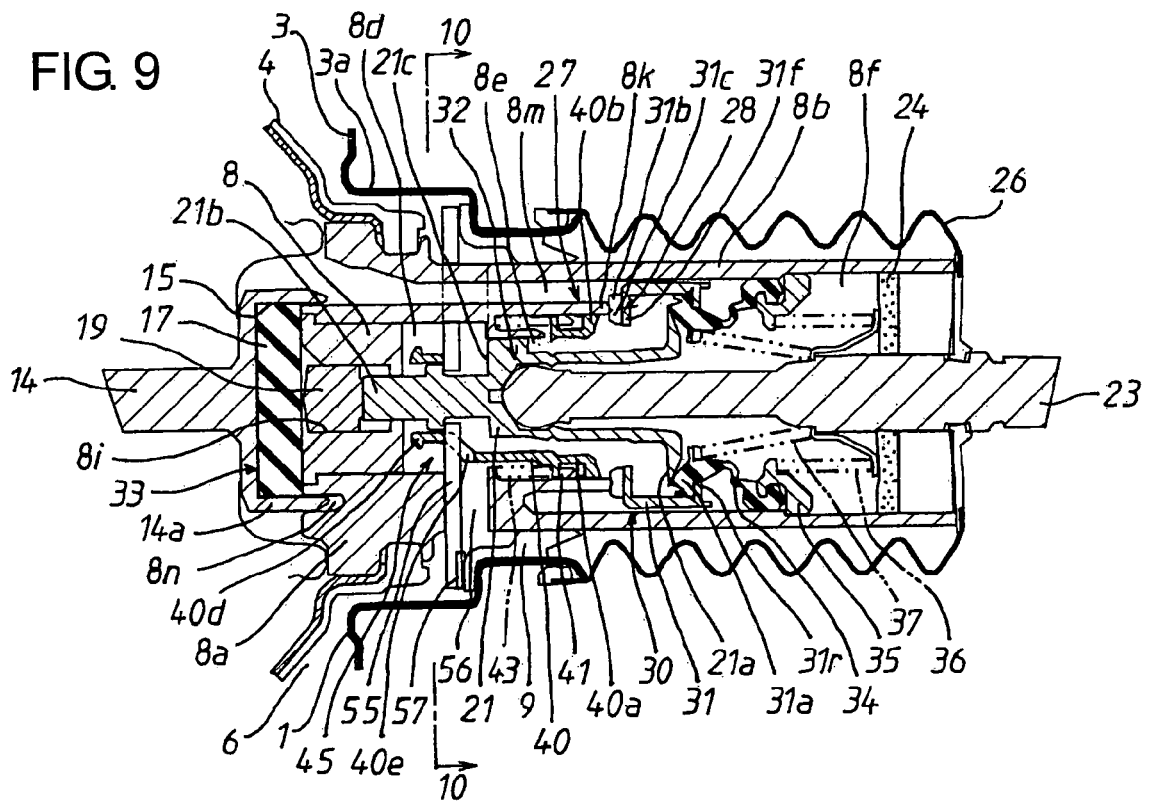
FIG. 9 is an enlarged fragmentary sectional view of a valve mechanism section of a vacuum type booster device in a third embodiment according to the present invention.

The operation of the vacuum type booster device in the third embodiment as constructed above will be described hereinafter. The state shown in FIG. 9 is the state that the brake pedal 25 is not being stepped, wherein the valve mechanism 30 is placed in the output power decreasing action state with the variable pressure chamber 6 being in communication with the vacuum chamber 5 and being blocked from the atmosphere. That is, since the input member 32 and the power piston 8 are in contact with the key member 50 being in contact with the housing 1, the atmosphere valve seat 21a is in contact with the atmosphere valve 31a, and the fixed vacuum valve seats 8k are held separated a slight amount from the first vacuum valve seats 31b, so that the pressure within the variable pressure chamber 6 has been lowered to the same pressure as that within the vacuum chamber 5.

Accordingly, no advance force is acting on the diaphragm 4 and the power piston 8 as movable members, and the diaphragm 4 and the power piston 8 have been retracted by the resilient force of the return spring 16. Since the load of the leaf spring 57 in the close-state is weaker than the urging force of the return spring 16, the leaf spring 57 is closely contacted with the key member 55 and the housing 1, whereby the power piston 8 is held at the retracted position with the key member 55 being in contact with the rear inner end of the housing 1. At this time, the engaging portion 40d of the movable valve seat member 40 is in engagement with the mid portion of the key member 55, and the movable vacuum valve seat 40b is at the position where it has been advanced beforehand by a predetermined amount beyond the fixed vacuum valve seats 8k.

When by the stepping of the brake pedal 25, the in put rod 23 advances the plunger 21 against the resilient force of the compression spring 36, the valve mechanism 30 is switched from the output power decreasing action state to the output power holding action state. As the input member 32 is advanced further, the valve mechanism 30 is switched to the output power increasing action state, whereby an advance force depending on the pressure difference between the variable pressure chamber 6 and the vacuum chamber 5 is generated on the diaphragm 4. The advance force is transmitted from the power piston 8 to the output rod 14 through the reaction disc 17, and the operation of the master cylinder 11 is started. With the advance of the power piston 8 relative to the input member 32, the atmosphere valve 31a of the valve member 31 is again brought into contact with the atmosphere valve seat 21a, whereby the valve mechanism 30 is switched to the output power holding action state.

At the early stage of the advance of the power piston 8, the key member 55 is urged at its mid portion backward by the compression spring 43 through the movable valve seat member 40 and is also urged at its one end portion forward by the leaf spring 57. Thus, the key member 55 is brought into an inclination state wherein it is in contact with the housing 1 at the other end portion thereof and is pressured on the front wall of the radial through hole 56 on one end side thereof, and the inclination is increased with the advance of the power piston 8.

Now, a symbol A is taken as the length between a point 58 at which the other end portion of the key member 55 contacts with the housing 1 and another point 59 at which the engaging portion 40b of the movable valve seat member 40 contacts with the mid portion of the key member 55, and a symbol B is taken as the length between the point 59 and another point 60 at which the key member 55 contacts with the front wall of the radial through holes 56 on one end side. In this case, the movable valve seat member 40 is retracted relative to the power piston 8 by the amount which is calculated by multiplying the advance amount of the power piston 8 with the lever ratio A/(A+B). In this way, it become possible in the third embodiment to make the spring force of the leaf spring 57 larger than the spring force of the compression spring 43, and thus, it can be realized to make the retraction of the movable valve seat member 40 begin from the early stage of the advance of the power piston 8.

At the advance early stage (the state shown in FIG. 11) of the power piston 8 and while the movable vacuum valve seat

40*b* is at a position advanced beyond the fixed vacuum valve seats 8*k*, the fixed vacuum valve seats 8*k* act as the vacuum valve seat 27 and is being in contact with the first vacuum valves 31*b* acting as the vacuum valve 28. Thus, the vacuum valve seat 27 is moved by the same amount as the power piston 8 is done. That is, the retraction amount of the vacuum valve seat 27 relative to the power piston 8 is null, so that the operation performed in the third embodiment is the same as that in the conventional vacuum type booster device which does not have the function of shortening the operation stroke of the input member 32.

When the driver increases the manipulation amount of the brake pedal 25, the valve mechanism 30 is switched to the output power increasing action state, whereby the atmospheric air flows into the variable pressure chamber 6 to exert the advance force on the diaphragm 4. Thus, the power piston 8 is advanced relative to the housing 1, the inclination of the key member 55 becomes large, and the movable vacuum valve seat 40*b* is retracted relative to the power piston 8. As a result, the movable vacuum valve seat 40*b* is retracted soon beyond the fixed vacuum valve seats 8*k* (the state shown in FIG. 12), so that the advance mount of the power piston 8 and the output rod 14 becomes larger than the advance mount of the input member 32. Since the increase of the advance amount takes place gradually in proportion to the advance amount of the input member 32, it is unlikely that there is generated an impact or shock which would cause the driver to feel unpleasantly. In this course of operation, the reaction disc 17 is compressively deformed by the power piston 8 and the output rod 14 to enter the through hole 8*i* of the power piston 8, and after going through the jump-up state, comes into contact with the front end of the plunger 21 to exert a reaction force on the input member 32.

When the further advance of the power piston 8 causes the key member 55 to incline larger, the urging force of the leaf spring 57 decreases. Now, symbols f1, f2 and f3 are taken respectively as the urging forces of the compression spring 43, the leaf spring 57 and the compression spring 37, the symbol A is taken as the length between the point 58 at which the other end portion of the key member 55 contacts with the housing 1 and the point 59 at which the engaging portion 40*b* of the movable valve seat member 40 contacts with the mid portion of the key member 55, and a symbol C is taken as the length between the point 59 and a sitting point 63 at which the leaf spring 57 sits on the key member 55. In this case, when the following expression holds, the key member 55 goes off the front wall of the radial through hole 56 on one end side (the state shown in FIG. 13)

$$A \times (f1-f3) = (A+C) \times f2$$

Now, symbols F1 and F2 are taken respectively to represent the urging forces f1 and f2 at this time, a symbol s1 is taken as the advance amount by which the power piston 8 advances from this state, a symbol s2 is taken as the retraction amount of the movable valve seat member 40 relative to the power piston 8, and symbols k1 and k2 are taken respectively as the spring constants of the compression spring 43 and the leaf spring 57. In this case, the length of the compression spring 37 remains unchanged, and thus, the following expression holds.

$$A \times (F1-s2 \times k1-f3) = (A+C) \times [F2-(s1-s2) \times (A+C)/A \times k2]$$

This is followed by the expression below.

$$A^2 \times s2 \times k1 = (A+C)^2 \times (s1-s2) \times k2$$

which is transformed as follows:

$$(A+C)^2 \times k2 \times s1 = [A^2 \times k1 + (A+C)^2 \times k2] \times s2$$

Thus, the movable valve seat member 40 is retracted relative to the power piston 8 by the amount s2 which is calculated by multiplying the advance amount s1 of the power piston with the following ratio.

$$[(A+C)^2 \times k2]/[A^2 \times k1 + (A+C)^2 \times k2] (<1)$$

Figure 14:
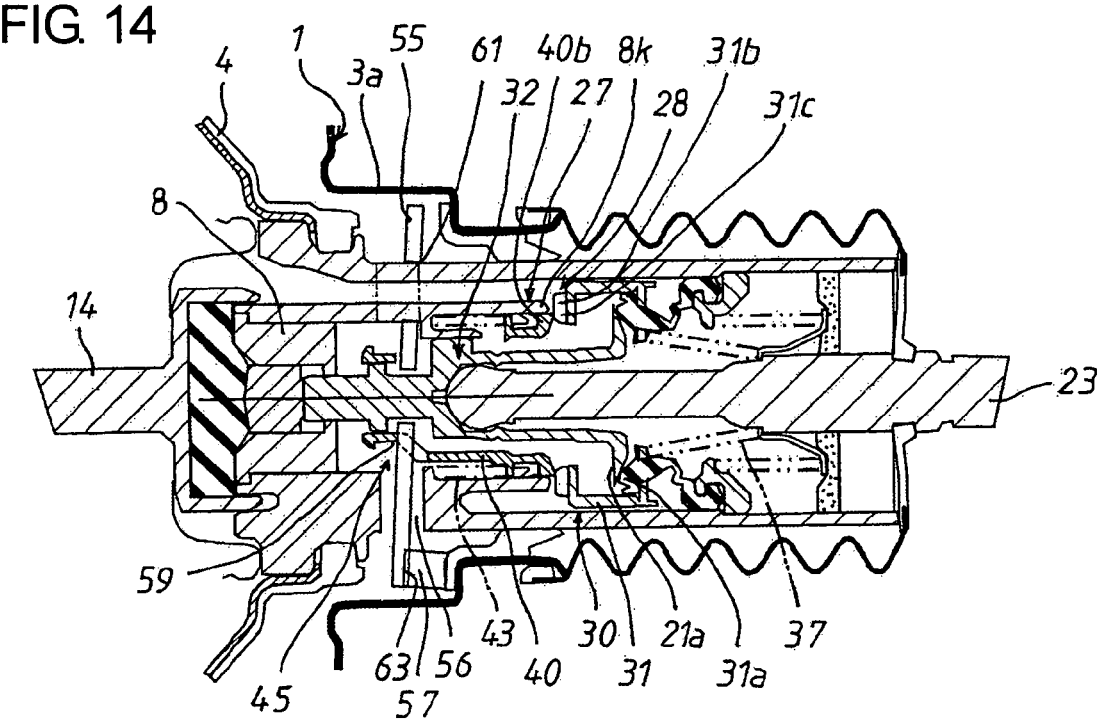
FIG. 14 is an enlarged fragmentary sectional view of the valve mechanism section showing the state that the key member goes off the front wall of the radial through hole on one end side and is in contact with a rear wall of the radial through hole on the other end side.

When the power piston 8 is further advanced, the key member 55 whose the other end portion has remained in contact with the housing 1 comes into contact with the radial through hole 56 on the other end side of the power piston 8 and is separated from the from the housing 1 thereafter (the state shown in FIG. 14). Now, symbols F1', F2' and f3 are taken as the urging forces which the compression spring 43, the leaf spring 57 and the compression spring 37 respectively have at that time, a symbol D is taken as the length between a point 61 at which the key member 55 contacts with the radial through hole 56 on the other end side and the point 59 at which the engaging portion 40*d* of the movable valve seat member 40 contacts with the mid portion of the key member 55, and the symbol C is taken as the length between the point 59 and the sitting point 63 at which the leaf spring 57 sits on the key member 55. In this case, the following expression holds.

$$D \times (F1'-f3) = (D+C) \times F2'$$

Where symbols s1' and s2' are taken as the advance amount of the power piston 8 and the retraction amount of the movable valve seat member 40 from this time point and where the symbols k1 and k2 are taken respectively as the spring constants of the compression spring 43 and the leaf spring 57, the compression spring 43 stretches by the amount s2', and the leaf spring 57 stretches by the amount s1'−s2'×(D+C)/D.

However, since the length of the compression spring 37 remains unchanged, the following expression holds.

$$D \times (F1'-s2' \times k1-f3) = (D+C) \times [F2'-k2 \times s1'+k2 \times s2' \times (D+C)/D]$$

This is followed by the expression below.

$$D^2 \times s2' \times k1 = D \times (D+C) \times s1' \times k2 - (D+C)^2 \times s2' \times k2$$

which is transformed as follows:

$$[D2 \times k1 + (D+C)^2 \times k2] \times s2' = D \times (D+C) \times k2 \times s1'$$

Thus, the movable valve seat member 40 is retracted relative to the power piston 8 by the amount s2' which is calculated by multiplying the advance amount s1' of the power piston 8 with the following ratio.

$$[D \times (D+C) \times k2]/[D^2 \times k1 + (D+C)^2 \times k2] (<1)$$

Figure 15:
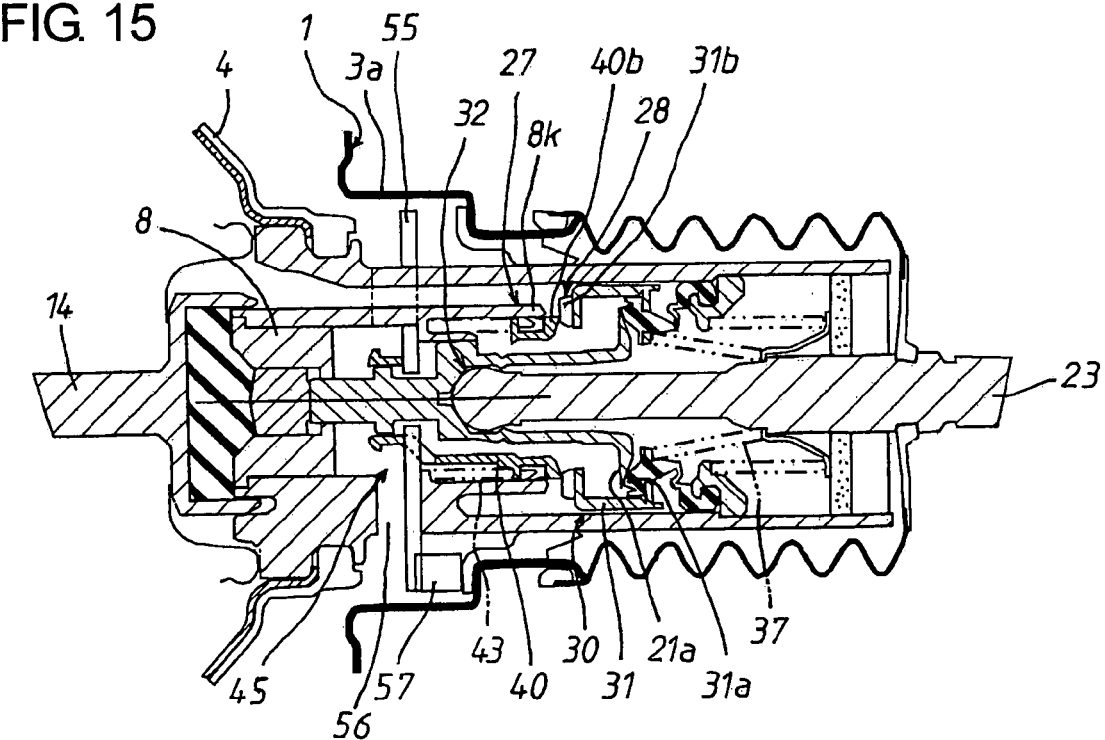
FIG. 15 is an enlarged fragmentary sectional view of the valve mechanism section showing the state that the key member is in contact with the rear wall of the radial through hole on both of one and the other end sides.
Figure 16:
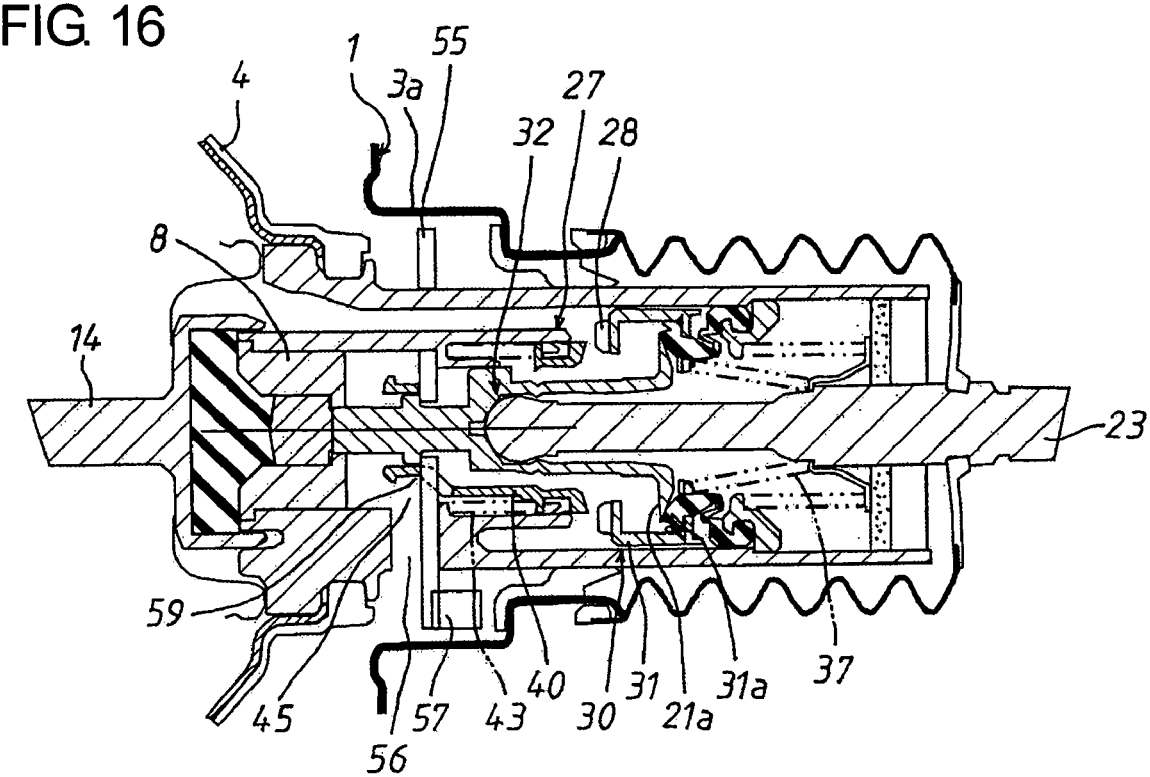
FIG. 16 is an enlarged fragmentary sectional view of the valve mechanism section in the quick braking release state in the third embodiment.

When the power piston 8 is further advanced, the key member 55 is brought into contact with the rear walls of the radial through holes 56 at one and the other end sides thereof (the state shown in FIG. 15). In this state, the movable vacuum valve seat 40*b* has been retracted by a predetermined amount beyond the fixed vacuum valve seats 8*k*, and even when the power piston 8 is further advanced, the key member 55 and the movable vacuum valve seat 40*b* are advanced bodily with the power piston 8. In this way, it can be realized to gradually increase the operation stroke of the output rod 14 longer than the operation stroke of the input member 32.

At the time of braking release, the brake pedal 25 is released to allow the retraction of the input member 32. The atmosphere valve seat 21a comes into contact with the atmosphere valve 31a to move the valve member 31 backward against the resilient force of the compression spring 37, and hence, the second vacuum valve 31c is separated from the movable vacuum valve seat 40b to make the variable pressure chamber 6 communicate with the vacuum chamber 5. In particular, where the brake pedal 25 is released quickly, the input member 32 is retractable relative to the power piston 8 until it comes into contact with the key member 55 which is held in contact with the rear wall of the radial through hole 36 (the state shown in FIG. 16), and the opening amount of the second vacuum valve 31c from the movable vacuum valve seat 40b is approximately equal to the step between the fixed vacuum valve seats 8k and the movable vacuum valve seat 40b with the valve mechanism 30 being held in the non-braking state shown in FIG. 9. As the braking release is continued as it goes, the operation state of the device comes close to the non-braking state shown in FIG. 9 by way of a process opposite to that at the time of piston advance. At the time of brake pedal release, since the resilient force of the compression spring 37 is received at the atmosphere valve seat 21a not to be applied to the movable valve seat member 40, the retraction amount of the movable valve seat member 40 relative to the advance amount of the power piston 8 differs from that at the time of pedal stepping. In the third embodiment, however, since the retraction of the movable valve seat member 40 can be initiated from the early stage that the power piston 8 is advanced at the time of pedal stepping even if the spring force of the leaf spring 57 is set to be strong as mentioned earlier, it does not occur even at the time of pedal release that the leaf spring 57 is flatted to the final stage shown in FIG. 9, so that it can be realized to perform the return motion of the movable valve seat member 40 smoothly.

Further, although also in the third embodiment, the state of the valve mechanism 30 in the non-braking state is placed in the output power decreasing action state that the variable pressure chamber 6 is made to communicate with the vacuum chamber 5 and to be blocked from the atmosphere, it may be placed in the output power holding action state that the variable pressure chamber 6 is made to be blocked from the vacuum chamber 5. Vacuum type booster devices of the construction so modified have been in wide use, wherein both of the power piston 8 and the plunger 21 are positioned by the key member 55 in the state that no vacuum is being admitted into the vacuum chamber 5 because of an engine being stopped. It has been known that when the engine start causes the vacuum to be admitted into the vacuum chamber 5, the power piston 8 is advanced slightly to bring about the state that the pressure difference between the vacuum chamber 6 and the variable pressure chamber 6 balances with the resilient force of the return spring 16. Where this construction is applied to the third embodiment, the leaf spring 57 overcomes the compression spring 43 at the early stage in the advance of the piston 8. Thus, when the vacuum is admitted into the vacuum chamber 5, not only the power piston 8 is advance, but the key member 55 is also advanced as it is inclined, and the plunger 21 is also advanced. If the advance amount of the plunger 21 were the same as the advance amount of the power piston 8, the variable pressure chamber 6 would remain blocked from the vacuum chamber 5 and the power piston 8 would proceed apace. In the third embodiment, however, the plunger 21 is retracted relative to the power piston 8 by the amount which is calculated by multiplying the advance amount of the power piston 8 with a lever ratio E/(E+F), where a symbol E is taken as the length between the point 58 at which the other end portion of the key member 55 contacts with the housing 1 and the point 62 at which the front end surface of the engaging groove 21c of the plunger 21 contacts with the mid portion of the key member 55 and where another symbol F is taken as the length between the point 62 and the point 60 at which key member 55 contacts with the front wall of the radial through hole 56 on one end side thereof. In this way, the advance amount of the plunger 21 becomes E/(E+F) times (<1) the advance amount of the power piston 8, and the advance of the power piston 8 causes the vacuum type booster device to be switched to the output power holding action state shortly. Therefore, there does not arise a problem that the initial position is unstable at the time of admission of the vacuum.

In the foregoing embodiments, the reaction force to the input member 32 is given from the reaction force applying means 33 including the reaction disc 17. However, as described in U.S. Pat. No. 5,323,685 (equivalent of Japanese Unexamined Published Patent Application No. 5-193486), the reaction force applying means 33 may be constructed so that a propelling force generated on a small diameter piston which receives the pressure of the master cylinder is applied to the input member. In this modified form, the output power increasing tendency which results from making the operation stroke of the input member shorter than the operation stroke of the output member does not take place in the input-output power characteristic.

Figure 7:
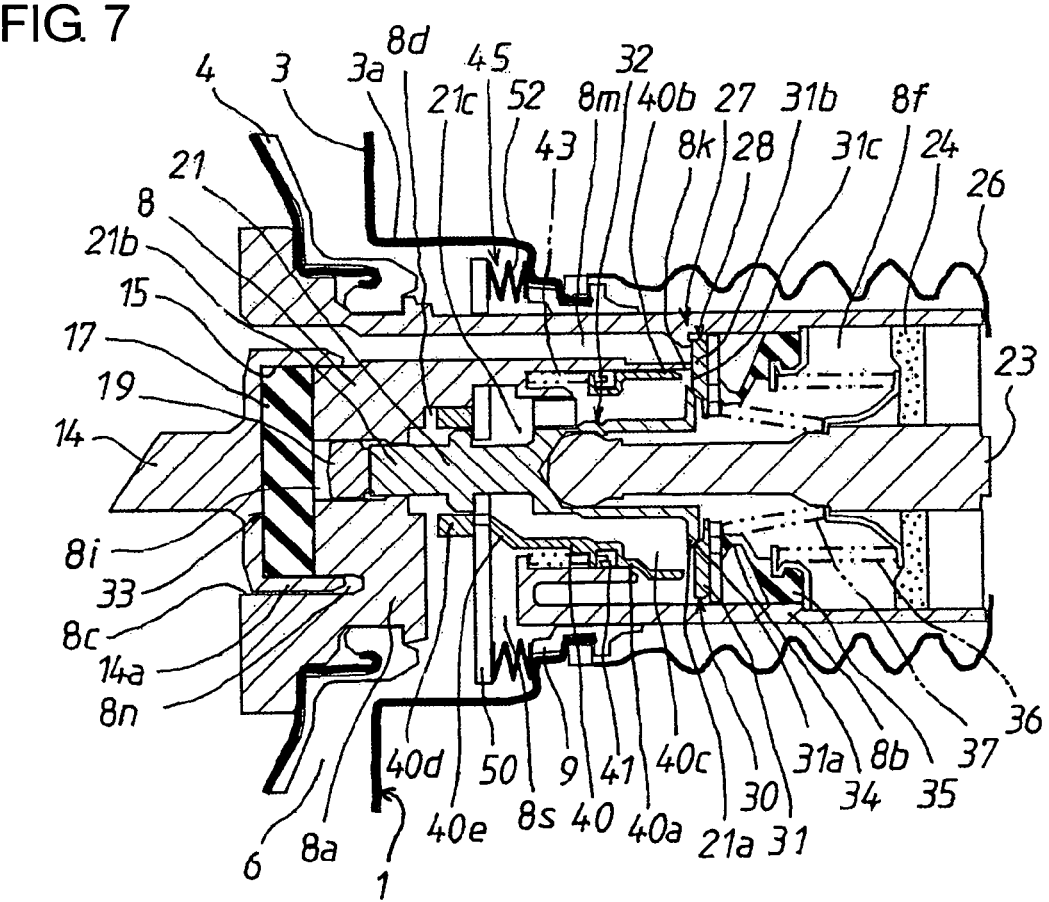
FIG. 7 is an enlarged fragmentary sectional view of a valve mechanism section in the non-braking state in a second embodiment according to the present invention.

Finally, various features and many of the attendant advantages in the foregoing embodiments will be summarized as follows:

In each of the foregoing first to third embodiments typically shown in FIGS. 2, 7 and 9, when the advance of the input member 32 causes the atmosphere valve seat 21a to be separated from the atmosphere valve 31a to advance the power piston 8, the position of the vacuum valve seat 27 is moved backward relative to the power piston 8 by the distance to which the advance amount of the power piston 8 relative to the housing 1 is decreased at the predetermined ratio. Thus, when a slight advance of the input member 32 causes the atmosphere valve seat 21a to be separated from the atmosphere valve 31a, the power piston 8 is advanced by the amount which is obtained by adding the retraction amount of the vacuum valve seat 27 relative to the power piston 8 to the advance amount of the input member 32, so that the valve mechanism 30 can be closed again with the advance of the power piston 8. Therefore, it does not take place that the power piston 8 is advanced as quickly as the driver is given an uncomfortable feeling when the atmosphere valve seat 21a is separated from the atmosphere valve 31a upon advance of the input member 32. Further, the power piston 8 can be advanced smoothly with the advance of the input member 32, and the operation stroke of the output member 14 can be gradually increased to be longer by the predetermined amount than the operation stroke of the input member 32. Accordingly, it can be realized to shorten the operation stroke of the input member 32 at a stroke portion called a "play" which a master cylinder 11 or the like on the output member 14 side has at the stepping early stage of the brake pedal 25.

In the foregoing first embodiment typically shown in FIG. 2, when the power piston 8 is advanced, the lever member 22 is carried on one end side thereof to be inclinable about the fulcrum point 8r on the power piston 8, is in contact with the housing 1 at the other end portion thereof and is engaged at the mid portion thereof with the movable valve seat member 40 having the movable vacuum valve seat 40b formed thereon. Thus, since the movable vacuum valve seat 40b is moved backward relative to the power piston 8 by the distance to which the advance amount of the power piston 8 relative to the housing 1 is decreased at the predetermined lever ratio, a vacuum type booster device which performs the same effects as described above can be provided in a simplified construction.

Also in the foregoing first embodiment typically shown in FIG. 2, since the lever member 22 functions as a key member for restricting the retraction of the input member 32 relative to the housing 1, it can be realized to construct the vacuum valve seat retracting mechanism at a low cost.

In the foregoing second embodiment typically shown in FIG. 7, the movable valve seat member 40 having the movable vacuum valve seat 40b formed thereon is urged by the first spring 43 backward relative to the power piston 8 and is urged by the second spring 52 forward relative to the housing 1. Thus, when the power piston 8 is advanced, the movable vacuum valve seat 40b is moved backward relative to the power piston 8 by the distance to which the advance amount of the power piston 8 relative to the housing 1 is decreased at the predetermined ratio depending on the spring constants of the first and second springs 43, 52. Therefore, a vacuum type booster device which performs the same effects as described above can be provided in a simplified construction.

Also in the foregoing second embodiment typically shown in FIG. 7, since the movable valve seat member 40 is engaged with the key member 50 which radially passes through the power piston 8 for restricting the retraction of the input member 32 relative to the housing 1 and since the second spring 52 for urging the movable valve seat member 40 forward relative to the housing 1 is interposed between the housing 1 and the key member 50, it can be realized with a simplified construction to retract the position of the vacuum valve seat 27 by the distance to which the advance amount of the power piston 8 relative to the housing 1 is decreased at the predetermined ratio.

In the foregoing third embodiment typically shown in FIG. 9, as the advance of the input member 32 causes the atmosphere valve seat 21a to be separated from the atmosphere valve 31a to advance the power piston 8, the key member 55 is switched from the state that the key member 55 is diametrically placed in contact with the housing 1 at the opposite ends thereof as well as in contact with the front walls of the radial through holes 56 of the power piston 8 on the opposite end sides thereof, in turn to the inclination increasing state that the key member 55 contacts with the front wall of the radial through hole 56 on one end side and with the housing 1 at the other end portion thereof, then to the inclination decreasing state that the key member 55 is separated from the front wall of the radial through hole 56 on one end side thereof and contacts with the rear wall of the radial through hole 56 on the other end side thereof and to the state that the key member 55 is placed radially in contact with the rear walls of the radial through holes 56 on the opposite end sides thereof, in depending on the urging forces of the first and second springs 43, 57. The movable valve seat member 40 is gradually moved backward relative to the power piston 8 by the distance to which the advance amount of the power piston 8 relative to the housing 1 is decreased at the lever ratio depending on the inclination of the key member 55, and the movable vacuum valve seat 40b is positioned backward by the predetermined distance beyond the fixed vacuum valve seats 8k. Therefore, when the slight advance of the input member 32 causes the atmosphere valve seat 21a to be separated from the atmosphere valve 31a, the power piston 8 is advanced by the distance which is obtained by adding the retraction amount of the vacuum valve seat 27 relative to the power piston 8 to the advance amount of the input member 32, whereby the valve mechanism 30 can be closed again with the advance of the power piston 8.

Therefore, it does not take place that the power piston 8 is advanced as quickly as the driver is given an uncomfortable feeling upon advance of the input member 32, and the power piston 8 can be advanced smoothly with the advance of the input member 32. Further, since the key member 50 is moved as it is inclined between the front and rear walls of the radial through holes 56 which are provided in the power piston 8 to have the minimum necessary width, it can be realized to increase the operation stroke of the output member 14 gradually and smoothly to be longer by the predetermined amount than the operation stroke of the input member 32, and it can be also realized to make the device downsized and lightened.

Further, at the time of braking release, the key member 55 is switched from the state that the key member 55 is diametrically positioned in contact with the rear walls of the radial through holes 56 of the power piston 8 on the opposite end sides, in turn to the state that the key member 55 contacts with the housing 1 through the second spring 57 at one end portion and with the housing 1 at the other end portion, then to the state that the key member 55 contacts with the front wall of the radial through hole 56 at one end side and with the housing 1 at the other end portion, and to the state that the key member 55 is diametrically positioned in contact with the front walls of the radial through holes 56 on the opposite end sides. The movable valve seat member 40 is gradually moved by the key member 55 forward relative to the power piston 8 in dependence on the retraction moving amount of the power piston 8 relative to the housing 1, whereby the movable vacuum valve seat 40b is positioned forward by the predetermined distance beyond the fixed vacuum valve seats 8k. Therefore, it does not take place that the power piston 8 is retracted as quickly as the driver is given an uncomfortable feeling upon the retraction of the input member 32 near to the retraction end.

In the foregoing third embodiment typically shown in FIG. 9, since as the second spring for urging one end portion of the key member 55 forward, the leaf spring 57 is secured to one end portion of the key member 55, it can be realized with a simplified construction to urge one end portion of the key member 55 forward reliably.

In each of the foregoing first to third embodiments typically shown in FIGS. 2, 7 and 9, when the valve mechanism 30 is in the non-braking state, the movable vacuum valve seat 40b is positioned at a position advanced beyond the fixed vacuum valve seats 8k, in which state the fixed vacuum valve seats 8k operate as the vacuum valve seat 27 at the early stage of a braking operation. On the other hands, after the power piston 8 is advanced longer than the predetermined amount, the movable vacuum valve seat 40b is moved backward beyond the fixed vacuum valve seats, in which state the movable vacuum valve seat 40b operates as the vacuum valve seat 27. Therefore, it can be realized with a simplified construction to move the position of the vacuum valve seat 27 backward relative to the power piston 8 when the power piston 8 is advanced. Further, since the step between the movable vacuum valve seat 40b and the fixed vacuum valve seats 8k in the non-braking state can be secured as the separation amount of the atmosphere valve seat 21a from the atmosphere valve 31a in the braking release state, it can be realized to make the opening amount of the first vacuum valves 31b from the fixed vacuum valve seats 8k minimal and hence, it can also be realized to make the loss stroke of the input member 23 remain minimal.

Obviously, numerous further modifications and variations of the present invention are possible in light of the above teachings. It is therefore to be understood that within the scope of the appended claims, the present invention may be practiced otherwise than as specifically described herein.

What is claimed is:

1. A vacuum type booster device comprising:
a housing having a pressure space formed inside;
a movable member provided in the housing to be movable in a forward-backward direction and partitioning the pressure space into a variable pressure chamber and a vacuum chamber;
a power piston secured to the movable member;
an input member and an output member carried in the power piston to be movable relative to each other in the forward-backward direction;
a valve mechanism including an atmosphere valve seat and a vacuum valve seat respectively provided on the input member and the power piston, an atmosphere valve contactable to the atmosphere valve seat for making the variable pressure chamber communicate with, or blocked from, the atmosphere, and a vacuum valve contactable with the vacuum valve seat for making the variable pressure chamber communicate with, or blocked from, the vacuum chamber;
a reaction force applying mechanism for transmitting a reaction force from the output member to the input member;
a vacuum valve seat retracting mechanism for moving the position of the vacuum valve seat backward relative to the power piston by a first distance, wherein the first distance is a predetermined ratio of a second distance, wherein the power piston is moved relative to the housing by the second distance, when the advance of the input member causes the atmosphere valve seat to be separated from the atmosphere valve to advance the power piston; wherein:
the vacuum valve seat is composed of a fixed vacuum valve seat provided on the power piston and a movable vacuum valve seat formed on a movable valve seat member which is air-tightly fitted in an internal surface of the power piston movably in the forward-backward direction; and
the vacuum valve seat retracting mechanism is composed of a spring for urging the movable valve seat member backward relative to the power piston and a lever member radially passing through the power piston;
wherein the lever member is carried on one end side thereof to be inclinable about a fulcrum point on the power piston, is in contact with the housing at the other end portion thereof and is engaged with the movable valve seat member at a mid portion thereof so that the movable vacuum valve seat is movable backward relative to the fixed vacuum valve seat by the first distance which is a predetermined lever ratio of the second distance.

2. The vacuum type booster device as set forth in claim 1, wherein the lever member functions as a key member for restricting the retraction of the input member relative to the housing.

3. The vacuum type booster device as set forth in claim 1, wherein:
the movable vacuum valve seat is positioned at a position advanced beyond the fixed vacuum valve seat when the valve mechanism is in a non-braking state, but is positioned at another position retracted beyond the fixed vacuum valve seat when the power piston is advanced longer than the predetermined amount; and
the fixed vacuum valve seat operates as the vacuum valve seat at an early stage of a braking operation, while the movable vacuum valve seat operates as the vacuum valve seat after the power piston is advanced longer than the predetermined amount.

4. A vacuum type booster device comprising:
a housing having a pressure space formed inside;
a movable member provided in the housing to be movable in a forward-backward direction and partitioning the pressure space into a variable pressure chamber and a vacuum chamber;
a power piston secured to the movable member;
an input member and an output member carried in the power piston to be movable relative to each other in the forward-backward direction;
a valve mechanism including an atmosphere valve seat and a vacuum valve seat respectively provided on the input member and the power piston, an atmosphere valve contactable to the atmosphere valve seat for making the variable pressure chamber communicate with, or blocked from, the atmosphere, and a vacuum valve contactable with the vacuum valve seat for making the variable pressure chamber communicate with, or blocked from, the vacuum chamber;
a reaction force applying mechanism for transmitting a reaction force from the output member to the input member;
a vacuum valve seat retracting mechanism for moving the position of the vacuum valve seat backward relative to the power piston by a first distance, wherein the first distance is a predetermined ratio of a second distance, wherein the power piston is moved relative to the housing by the second distance, when the advance of the input member causes the atmosphere valve seat to be separated from the atmosphere valve to advance the power piston; wherein:
the vacuum valve seat is composed of a fixed vacuum valve seat provided on the power piston and a movable vacuum valve seat formed on a movable valve seat member which is air-tightly fitted in an internal surface of the power piston movably in the forward-backward direction; and
the vacuum valve seat retracting mechanism is composed of a first spring for urging the movable valve seat member backward relative to the power piston and a second spring for urging the movable valve seat member forward relative the housing;
wherein the movable vacuum valve seat is moved backward relative to the fixed vacuum valve seat by the first distance which is the predetermined ratio of the second distance, the predetermined ratio depending on spring constants of the first and second springs, when the advance of the input member causes the atmosphere valve seat to be separated from the atmosphere valve to advance the power piston.

5. The vacuum type booster device as set forth in claim 4, further comprising a key member radially passing through the power piston for restricting the retraction of the input member relative to the housing;
wherein the movable valve seat member is engaged with the key member and wherein the second spring is interposed between the housing and the key member.

6. The vacuum type booster device as set forth in claim 4, wherein:
the movable vacuum valve seat is positioned at a position advanced beyond the fixed vacuum valve seat when the valve mechanism is in a non-braking state, but is positioned at another position retracted beyond the fixed vacuum valve seat when the power piston is advanced longer than the predetermined amount; and
the fixed vacuum valve seat operates as the vacuum valve seat at an early stage of a braking operation, while the movable vacuum valve seat operates as the vacuum valve seat after the power piston is advanced longer than the predetermined amount.

7. A vacuum type booster device comprising:
a housing having a pressure space formed inside;
a movable member provided in the housing to be movable in a forward-backward direction and partitioning the pressure space into a variable pressure chamber and a vacuum chamber;
a power piston secured to the movable member;
an input member and an output member carried in the power piston to be movable relative to each other in the forward-backward direction;
a valve mechanism including an atmosphere valve seat and a vacuum valve seat respectively provided on the input member and the power piston, an atmosphere valve contactable to the atmosphere valve seat for making the variable pressure chamber communicate with, or blocked from, the atmosphere, and a vacuum valve contactable with the vacuum valve seat for making the variable pressure chamber communicate with, or blocked from, the vacuum chamber;
a reaction force applying mechanism for transmitting a reaction force from the output member to the input member;
a vacuum valve seat retracting mechanism for moving the position of the vacuum valve seat backward relative to the power piston by a first distance, wherein the first distance is a predetermined ratio of a second distance, wherein the power piston is moved relative to the housing by the second distance, when the advance of the input member causes the atmosphere valve seat to be separated from the atmosphere valve to advance the power piston; wherein:
the vacuum valve seat is composed of a fixed vacuum valve seat provided on the power piston and a movable vacuum valve seat formed on a movable valve seat member which is air-tightly fitted in an internal surface of the power piston movably in the forward-backward direction; and
the vacuum valve seat retracting mechanism is composed of a first spring for urging the movable valve seat member backward relative to the power piston, a key member radially passing through radial through holes formed radially in the power piston, facing with the housing at opposite end portions thereof, and engaging with the movable valve seat member at a mid portion thereof, and a second spring for urging one end portion of the key member forward relative to the housing;
wherein the key member is brought into contact one of the housing and front and rear walls of the radial through holes in dependence on the position of the power piston relative to the housing and resilient forces of the first and second springs.

8. The vacuum type booster device as set forth in claim 7, wherein the second spring comprises a leaf spring secured to one end portion of the key member.

9. The vacuum type booster device as set forth in claim 7, wherein:
the movable vacuum valve seat is positioned at a position advanced beyond the fixed vacuum valve seat when the valve mechanism is in a non-braking state, but is positioned at another position retracted beyond the fixed vacuum valve seat when the power piston is advanced longer than the predetermined amount; and
the fixed vacuum valve seat operates as the vacuum valve seat at an early stage of a braking operation, while the movable vacuum valve seat operates as the vacuum valve seat after the power piston is advanced longer than the predetermined amount.

10. A vacuum type booster device comprising:
a housing having a pressure space formed inside;
a movable member provided in the housing to be movable in a forward-backward direction and partitioning the pressure space into a variable pressure chamber and a vacuum chamber;
a power piston secured to the movable member;
an input member and an output member carried in the power piston to be movable relative to each other in the forward-backward direction;
a valve mechanism including an atmosphere valve seat and a vacuum valve seat respectively provided on the input member and the power piston, an atmosphere valve contactable to the atmosphere valve seat for making the variable pressure chamber communicate with, or blocked from, the atmosphere, and a vacuum valve contactable with the vacuum valve seat for making the variable pressure chamber communicate with, or blocked from, the vacuum chamber, wherein the vacuum valve seat is comprised of a fixed vacuum valve seat provided on the power piston and a movable vacuum valve seat formed on a movable valve seat member which is air-tightly fitted in an internal surface of the power piston for movement in the forward-backward direction;
a reaction force applying mechanism for transmitting a reaction force from the output member to the input member; and
a vacuum valve seat retracting mechanism adapted to hold the movable vacuum valve seat at a position advanced beyond the fixed vacuum valve seat so that the fixed vacuum valve seat operates as the vacuum valve seat at an early stage of a braking operation, and adapted to move the movable vacuum valve seat to another position retracted from the fixed vacuum valve seat so that the movable vacuum valve seat operates as the vacuum valve seat after the power piston is advanced more than a predetermined amount.

11. The vacuum type booster device as set forth in claim 10, wherein the vacuum valve seat is comprised of a plurality of fixed vacuum valve seats.

12. The vacuum type booster device as set forth in claim 10, further comprising passages formed in a side wall of the power piston which communicate with the vacuum chamber, the passages being surrounded by the fixed vacuum valve seat.

13. The vacuum type booster device as set forth in claim 10, wherein the vacuum valve seat retracting mechanism comprises a spring urging the movable valve seat member in the backward direction.

14. The vacuum type booster device as set forth in claim 10, wherein the vacuum valve seat retracting mechanism comprises a lever member engaged by an engaging portion of the movable valve seat member.

15. The vacuum type booster device as set forth in claim 10, wherein the vacuum valve seat retracting mechanism comprises a first spring urging the movable valve seat member in the backward direction relative to the power piston and a second spring urging the movable valve seat member in the forward direction relative to the housing.

16. A vacuum type booster device comprising:
a housing having a pressure space formed inside;
a movable member provided in the housing to be movable in a forward-backward direction and partitioning the pressure space into a variable pressure chamber and a vacuum chamber;
a power piston secured to the movable member;
an input member and an output member carried in the power piston to be movable relative to each other in the forward-backward direction;
a valve mechanism including an atmosphere valve seat and a vacuum valve seat respectively provided on the input member and the power piston, an atmosphere valve contactable to the atmosphere valve seat for making the variable pressure chamber communicate with, or blocked from, the atmosphere, and a vacuum valve contactable with the vacuum valve seat for making the variable pressure chamber communicate with, or blocked from, the vacuum chamber, wherein the vacuum valve seat is comprised of a fixed vacuum valve seat provided on the power piston and a movable vacuum valve seat formed on a movable valve seat member which is air-tightly fitted in an internal surface of the power piston for movement in the forward-backward direction;
a reaction force applying mechanism for transmitting a reaction force from the output member to the input member;
a vacuum valve seat retracting mechanism operable when advance of the input member causes the atmosphere valve seat to be separated from the atmosphere valve to advance the power piston, for moving the movable vacuum valve seat by a first distance backward relative to the power piston to hold the movable vacuum valve seat in contact with the vacuum valve while the power piston is moved by a second distance; and
wherein the vacuum valve seat retracting mechanism includes a mechanism adapted to maintain a moving ratio between the first and second distances to be a predetermined ratio so that the first distance is shorter than the second distance.

17. The vacuum type booster device as set forth in claim 16, wherein the vacuum valve seat is comprised of a plurality of fixed vacuum valve seats.

18. The vacuum type booster device as set forth in claim 16, wherein the vacuum valve seat retracting mechanism comprises a spring urging the movable valve seat member in the backward direction.

19. The vacuum type booster device as set forth in claim 16, wherein the vacuum valve seat retracting mechanism comprises a first spring urging the movable valve seat member in the backward direction relative to the power piston and a second spring urging the movable valve seat member in the forward direction relative to the housing.

* * * * *